(12) United States Patent
McCairn et al.

(10) Patent No.: US 10,703,857 B2
(45) Date of Patent: Jul. 7, 2020

(54) NANOPARTICLES

(71) Applicant: CHROMITION LIMITED, Stockport, Cheshire (GB)

(72) Inventors: Mark Christopher McCairn, Manchester (GB); Michael L. Turner, Manchester (GB)

(73) Assignee: CHROMITION LIMITED, Manchester (GB)

( * ) Notice: Subject to any disclaimer, the term of this patent is extended or adjusted under 35 U.S.C. 154(b) by 421 days.

(21) Appl. No.: 15/326,922

(22) PCT Filed: Jul. 20, 2015

(86) PCT No.: PCT/GB2015/052097
§ 371 (c)(1),
(2) Date: Jan. 17, 2017

(87) PCT Pub. No.: WO2016/009231
PCT Pub. Date: Jan. 21, 2016

(65) Prior Publication Data
US 2017/0198088 A1   Jul. 13, 2017

(30) Foreign Application Priority Data
Jul. 18, 2014   (GB) .................................. 1412824.3

(51) Int. Cl.
*C08G 61/12* (2006.01)
*C09K 11/06* (2006.01)
(Continued)

(52) U.S. Cl.
CPC ............ *C08G 61/02* (2013.01); *C08G 61/12* (2013.01); *C08G 61/122* (2013.01); *C08G 61/123* (2013.01); *C08G 61/126* (2013.01); *C08J 3/12* (2013.01); *C08L 65/00* (2013.01); *C09K 11/025* (2013.01); *C09K 11/06* (2013.01); *C08G 2261/124* (2013.01); *C08G 2261/135* (2013.01); *C08G 2261/148* (2013.01); *C08G 2261/1412* (2013.01); *C08G 2261/1424* (2013.01); *C08G 2261/1426* (2013.01); *C08G 2261/18* (2013.01); *C08G 2261/228* (2013.01); *C08G 2261/312* (2013.01); *C08G 2261/314* (2013.01);
(Continued)

(58) Field of Classification Search
CPC ...................................................... C08G 61/12
USPC .................................................... 528/39, 396
See application file for complete search history.

(56) References Cited

U.S. PATENT DOCUMENTS

2014/0017130 A1   1/2014   Trogler et al.

FOREIGN PATENT DOCUMENTS

| CN | 101323781 A | 12/2008 |
|----|-------------|---------|
| CN | 102627776   | 8/2012  |

OTHER PUBLICATIONS

PCT Search Report and Written Opinion for PCT/GB2015/052097, completed Sep. 15, 2015.
(Continued)

*Primary Examiner* — Duc Truong
(74) *Attorney, Agent, or Firm* — Barnes & Thornburg LLP

(57) ABSTRACT

Nanoparticle compositions comprising nanoparticles formed from π-conjugated cross-linked polymers are disclosed, together with their methods of manufacture and their applications. Owing to the nature of the cross-links formed therein, the nanoparticle compositions afford a high degree of manufacturing flexibility and control, as well as being amenable to facile purification for the purpose of imaging and electronics applications.

20 Claims, 12 Drawing Sheets

(51) Int. Cl.
*C08J 3/12* (2006.01)
*C08L 65/00* (2006.01)
*C08G 61/02* (2006.01)
*C09K 11/02* (2006.01)
*C08G 73/00* (2006.01)
*H01L 51/00* (2006.01)

(52) U.S. Cl.
CPC ............... *C08G 2261/3142* (2013.01); *C08G 2261/3162* (2013.01); *C08G 2261/3223* (2013.01); *C08G 2261/3246* (2013.01); *C08G 2261/344* (2013.01); *C08G 2261/364* (2013.01); *C08G 2261/37* (2013.01); *C08G 2261/374* (2013.01); *C08G 2261/411* (2013.01); *C08G 2261/414* (2013.01); *C08G 2261/522* (2013.01); *C08G 2261/524* (2013.01); *C08G 2261/90* (2013.01); *C08G 2261/91* (2013.01); *C08G 2261/92* (2013.01); *C08J 2365/00* (2013.01); *C09K 2211/1416* (2013.01); *C09K 2211/1425* (2013.01); *C09K 2211/1433* (2013.01); *C09K 2211/1458* (2013.01); *C09K 2211/1466* (2013.01); *C09K 2211/1483* (2013.01); *C09K 2211/185* (2013.01); *C09K 2211/188* (2013.01)

(56) References Cited

OTHER PUBLICATIONS

United Kingdom Search Report for GB1412824.3, completed Apr. 24, 2015.
Schmidt, Johannes, et al., "Microporous Conjugated Poly(Thienylene Arylene) Networks," 2009, Adv. Mater., No. 21, pp. 702-705.
Park, Jong-Jin, et al., "Pattern Formation of Silver Nanoparticles in 1-, 2-, and 3D Microstructures Fabricated by a Photo- and Thermal Reduction Method," 2010, Adv. Funct. Mater., No. 20, pp. 2296-2302.
Zhang, Shuang-Shuang, et al., "Preparation of Chiral and Fluorescent Nanoparticles of Hyperbranched Conjugated Polymers by the Solvent Chirality Transfer Technology," 2013, Acta Polymerica Sinica, No. 4, pp. 426-435 (English Translation of Abstract Only).
Behrendt, Jonathan M., et al., "Fluorescent Nanoparticles from PEGylated Polyfluorenes," 2013, Polym. Chem., No. 4, pp. 1333-1336.
Moon, Su-Young, et al., "Organic Sol-Gel Synthesis of Microporous Molecular Networks Containing Spirobfluorene and Tetraphenylmethane Nodes," 2013, Journal of Polymer Science, Part A, No. 51, pp. 1758-1766.
Ibrahimova, Vusala, et al., "Facile Synthesis of Cross-Linked Patchy Fluroscent Conjugated Polymer Nanoparticles by Click Reactions," 2011, Polym. Chem., No. 2, pp. 2818-2824.
Behrendt, Jonathan M., et al., "Hybrid Inorganic-Organic Composite Nanoparticles from Crosslinkable Polyfluorenes," 2013, J. Mater. Chem. C, No. 1, pp. 3297-3304.
Patra et al., "Fluorescent nanoparticles based on a microporous organic polymer network: fabrication and efficient energy transfer to surface-bound dyes," Chem. Commun., 2011, 47, 9612-9614.
Sun et al., "Toward High Molecular Weight Triphenylamine-Based Hyperbarnched Polymers," Macromolecules 38 (2005) 2651-2658.
Wang et al., "Synthesis and Characterization of Highly Stable Blue-Light-Emitting Hyperbranched Conjugated Polymers," Journal of Polymer Science: Part A Chemistry, 790-802.
Xin et al., "Hyperbranched Oxadiazole-Containing Polyfluorenes: Toward Stable Blue Light PLEDs," Macromolecules 38 (2005 6755-6758.
Zhang et al., "Preparation of Chiral and Fluorescent Nanoparticles of Hyperbranched Conjugated Polymers by the Solvent Chirality Transfer Technology," Acta Polymerica Sinica, No. 4, Apr. 2013, 426-435 (English abstract provided).

NANOPARTICLES

INTRODUCTION

The present invention relates to a nanoparticle composition comprising nanoparticles formed from π-conjugated cross-linked polymer, as well as to their methods of manufacture and their uses.

BACKGROUND OF THE INVENTION

Photoluminescent conjugated polymer nanoparticles (CPNs) are currently viewed as attractive alternatives to Quantum Dots (QDs) for applications ranging from biological imaging to consumer electronics.

QDs have previously shown promise in a number of in vitro and in vivo bioimaging applications, where they can be internalized by cells, allowing individual organelles to be stained. However, their potential for in vivo oxidative degradation, which can release toxic heavy metal species (e.g. cadmium and lead), ultimately precludes their use in humans or in long-term cell-tracking applications. Moreover, the use of such heavy metals is heavily restricted in certain territories, thereby underlining a need for less-toxic alternatives.

CPNs exhibit many of the desirable properties of QDs, including a small size (ca. 10-200 nm), photostable photoluminescence tunable across the visible spectrum, and the ability to be isolated as stable dispersions in water, whilst avoiding many of the toxicity-related drawbacks.

Behrendt et al. (Polym. Chem., 2013, 4, 1333-1336) discloses that replacing a proportion of the alkyl side chains present on polyfluorene non-cross-linked co-polymers with a more hydrophilic side chain has a significant influence on the size and optical properties of the resulting non-cross-linked CPNs.

Behrendt et al. (J. Mater. Chem. C, 2013, 1, 3297-3304) discloses hybrid inorganic-organic composite nanoparticles formed from polyfluorene having pendant triethoxysilyl side chains that are cross-linkable under basic conditions.

CN101323781A discloses nano-fluorescent microspheres having an outer shell made from a water-soluble polymer and an inner shell being a conjugated fluorescent structure, and cross-links between the inner and outer shells.

Zhang et al (Gaofenzi Xuebao (2013), (4), 426-435) discloses the preparation of chiral and fluorescent nanoparticles of hyperbranched conjugated polymers by solvent chirality transfer technology.

In spite of the advances made to date, it is necessary that limiting factors in the more widespread exploitation of phohotoluminescent CPNs be addressed before they can realize their full potential as a replacement for QDs. Amongst these are improved production processes, greater manufacturing control, and superior purity for use in biological applications.

The present invention was devised with the foregoing in mind.

SUMMARY OF THE INVENTION

According to a first aspect of the present invention there is provided a nanoparticle composition comprising a plurality of nanoparticles formed from a π-conjugated cross-linked polymer, the π-conjugated cross-linked polymer comprising
a) 80-99.9 mol. % of π-conjugated monomers, and
b) 0.1-20 mol. % of a cross-linker having the formula I shown below:

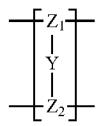

(I)

wherein
$Z_1$ and $Z_2$ are monomeric moieties, and
Y is absent, a bond, or a linking group.

According to a second aspect of the present invention, there is provided a method of forming a nanoparticle composition defined herein, the method comprising the step of forming the nanoparticles by emulsion polymerisation, miniemulsion polymerisation or dispersion polymerisation techniques to provide an aqueous suspension of nanoparticles.

According to a third aspect of the present invention, there is provided a nanoparticle composition obtainable, obtained, or directly obtained, by a method defined herein.

According to a fourth aspect of the present invention, there is provided a use of a nanoparticle composition defined herein in one or more applications defined herein.

According to a fifth aspect of the present invention, there is provided a nanoparticle dispersion comprising a nanoparticle composition as defined herein dispersed throughout a dispersing medium.

DETAILED DESCRIPTION OF THE INVENTION

Definitions

Unless otherwise stated, the following terms used in the specification and claims have the following meanings set out below.

References herein to the "Stille reaction" (also known as Stille coupling) refer to a well-known chemical reaction coupling involving an organotin compound with an $sp^2$-hybridized organic halide catalyzed by palladium. The reaction is widely used in organic synthesis. The use of Stille polymerisation reactions for the production of conjugated polymer systems is described in, for example, Chem. Rev. 2011, 111, 1493-1528. The general reaction scheme is shown below:

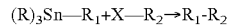

wherein
R is a hydrocarbyl substituent group, such as (1-6C)alkyl;
$R_1$ and $R_2$ are both monomeric units to be coupled; and
X is reactive group, typically a halide, such as Cl, Br, I, or a pseudohalide, such as a triflate, $CF_3SO_3^-$.

References to the "Suzuki reaction" refer to the well-known organic reaction of an aryl- or vinyl-boronic acid with an aryl- or vinyl-halide. Suzuki reactions are typically catalyzed by a palladium(0) complex catalyst. This reaction is well known in the chemical field and follows the general reaction scheme shown below:

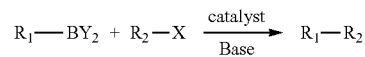

The reaction also works with pseudohalides, such as triflates (OTf), instead of halides. Boronic esters and organotrifluoroborate salts may be used instead of boronic acids. For polymer synthesis, $R_1$ and $R_2$ will represent monomeric units.

The term "hydrocarbyl" includes both straight and branched chain alkyl, alkenyl and alkynyl groups.

The term "alkylene" includes both straight and branched chain alkylene groups. References to individual alkylene groups such as "propylene" are specific for the straight chain version only and references to individual branched chain alkylene groups such as "isopropylene" are specific for the branched chain version only. For example, "(1-20C)alkylene" includes (1-14C)alkylene, (1-12C)alkylene, propylene, isopropylene and t-butylene. A similar convention applies to other radicals mentioned herein.

The terms "alkenylene" and "alkynylene" include both straight and branched chain alkenyl and alkynyl groups.

The term "aryl" is used herein to denote phenyl, naphthalene or anthracene ring. In an embodiment, an "aryl" is phenyl or naphthalene, and particularly is phenyl.

The term "heteroaryl" or "heteroaromatic" means an aromatic mono-, bi-, or tri-cyclic ring incorporating one or more (for example 1-4, particularly 1, 2 or 3) heteroatoms (for example N, O, P, S, Si, Ge, As or Se). Examples of heteroaryl groups are monocyclic, bicyclic and tricyclic groups containing from five to eighteen ring members. The heteroaryl group can be, for example, a 5- or 6-membered monocyclic ring, a 8-, 9- or 10-membered bicyclic ring or a 15-, 16-, 17- or 18-membered tricyclic ring. Suitably each ring in a bicyclic or tricyclic ring system comprises five or six ring atoms.

The term "cross-linked" used herein in relation to polymers does not encompass linear or hyperbranched polymers. The polymeric "branches" of hyperbranched polymers all emanate from a single focal point. In contrast, the polymeric strands of the cross-linked polymers forming part of the invention do not all converge to a single focal point. Rather, the strands of the cross-linked polymers forming part of the invention are randomly cross-linked to one another throughout polymer, with none of the cross-linking sites representing a single focal point in the sense of hyperbranched polymers. Furthermore, 4 or more polymeric chains emanate from a given cross-linking site within the polymers forming part of the invention, whereas the single focal point (or other branch points) within a hyperbranched polymer is only 3 coordinate. Moreover, the cross-linked polymers forming part of the invention are cross-linked to the extent that they are insoluble in all solvents (including aqueous, organic, polar and non-polar solvents), whereas hyperbranched polymers are commonly soluble.

Compositions of the Invention

As discussed hereinbefore, the present invention provides a nanoparticle composition comprising a plurality of nanoparticles formed from a π-conjugated cross-linked polymer, the π-conjugated cross-linked polymer comprising
a) 80-99.9 mol. % of π-conjugated monomers, and
b) 0.1-20 mol. % of a cross-linker having the formula I shown below:

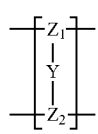

(I)

wherein
$Z_1$ and $Z_2$ are monomeric moieties, and
Y is absent, a bond, or a linking group.

The nanoparticle compositions of the present invention offer a number of advantages when compared with the state of the art. Principally, the nanoparticles forming the present compositions are formed from π-conjugated cross-linked polymers. The π-conjugated cross-linked polymers themselves comprise a backbone of π-conjugated monomers, with cross-linking moieties interspersed along the π-conjugated backbone. The structure of the cross-linking moieties is such that one monomer spans two polymeric backbone chains. Therefore, during assembly of the polymer, the incorporation of the cross-linking moieties into the π-conjugated backbone chain provides a direct site for the propagation of a further π-conjugated backbone chain on both sides of the cross-linking moiety. Hence, the cross-links in the polymers forming the present nanoparticle compositions are formed in-situ during linking of the monomer units, meaning that the degree of cross-linking can be readily adjusted simply by varying the concentration of cross-linker. Owing to their π-conjugated structures, cross-linked polymers of this type provide good electron delocalisation properties. Such polymers also offer the possibility of electron delocalisation between adjacent backbone chain via the cross-linker. In contrast to this direct, in-situ formation of cross-links discussed above, prior art CPNs have focussed on the preparation of polymers formed from monomers having specially-modified pendant side chains that are amenable to cross-linking under certain conditions. Whilst being a viable method, such an approach necessarily requires the initial step of forming the polymer backbone chains prior to placing the backbone chains under suitable conditions to induce cross-linking between them. This multi-step approach is more complex than that used to prepare the polymers forming the present compositions, and the degree of cross-linking between the polymeric chains is notably more difficult to control.

Aside from manufacturing simplicity and tuneability, the π-conjugated cross-linked polymers forming part of the invention lend themselves to obtaining nanoparticle compositions exhibiting significantly higher levels of purity. The insoluble cross-linker renders the nanoparticle composition insoluble in water and organic solvents, such that the π-conjugated cross-linked polymers exhibit swelling when brought into contact with a solvating solvent. Swelling the polymers in this manner allows impurities trapped within the polymeric network, such as catalysts and other reagents, to be easily removed by washing. Unlike prior art compositions, the resulting high purity photoluminescent nanoparticle compositions are therefore highly suitable for use in biological applications, such as bioimaging, and other in vivo processes.

Having regard to formula I, $Z_1$ is able to polymerise with π-conjugated polymer and aromatic monomers so as to form a first polymeric chain. $Z_2$ is able to polymerise with π-conjugated polymer and aromatic monomers so as to form a second polymeric chain, adjacent to the first polymeric chain, thereby linking together two adjacent polymeric chains. Accordingly, $Z_1$ and $Z_2$ may independently be selected from any of the examples of the moieties forming part or all of the monomers that are defined herein. In an embodiment, $Z_1$ and $Z_2$ are π-conjugated. In another embodiment, $Z_1$ and $Z_2$ are aromatic.

Still having regard to formula I, it will be appreciated that $Z_1$ and/or $Z_2$ may have more than 2 covalent attachment points (for attaching to the π-conjugated monomers). For example $Z_1$ and/or $Z_2$ may have 3 covalent attachment points.

Still having regard to formula I, Y may be any suitable linker group, and may be π-conjugated or non-π-conjugated. Exemplary linker groups include an atom (e.g. O, S), a metal (e.g. Ir, Pt, Rh, Re, Ru, Os, Cr, Cu, Pd, Au) or other group (e.g. —SiR$_2$—, —CH═CH—, —C$_6$H$_4$—). When Y is a bond, it may be a single or double bond. When Y is absent, $Z_1$ is directly linked to $Z_2$, e.g. $Z_1$ is fused to $Z_2$ or is connected thereto by a common (shared) spiro carbon atom.

The cross-linker of formula (I) may take a variety of forms. In particular, Y may be absent, a bond, or a linking group.

Where Y is absent (and $Z_1$ and $Z_2$ are linked directly to each other), the cross-linker may have a structure according for formula (Ia) below:

Examples of such cross-linkers include, but are not limited to:

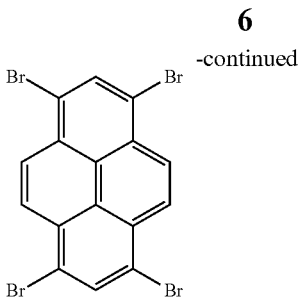

In such embodiments, $Z_1$ may be directed connected to $Z_2$ in the sense that $Z_1$ is fused to $Z_2$, or $Z_1$ and $Z_2$ share one or more common atoms.

Where Y is a bond (single or double), the cross-linker may have a structure according for formula (Ib) below:

Examples of such cross-linkers include, but are not limited to:

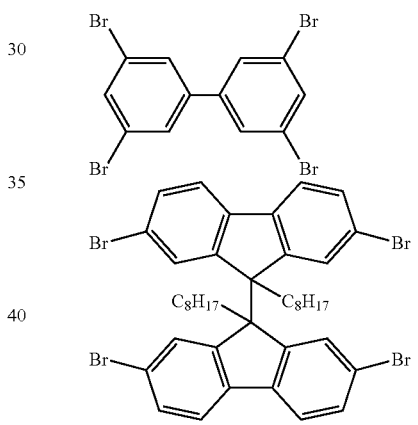

Where Y is a linking group, the linking group may be π-conjugated or non-π-conjugated. Examples of cross-linkers having π-conjugated linking groups include, but are not limited to:

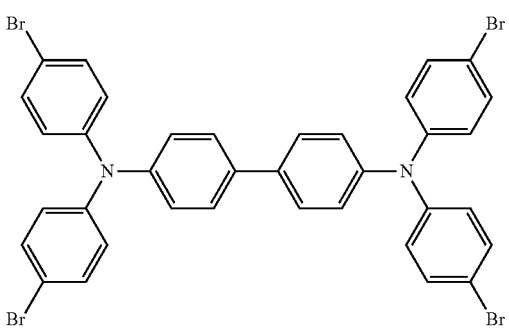 [SMILES: Brc1ccc(N(c2ccc(Br)cc2)c2ccc(-c3ccc(N(c4ccc(Br)cc4)c4ccc(Br)cc4)cc3)cc2)cc1]

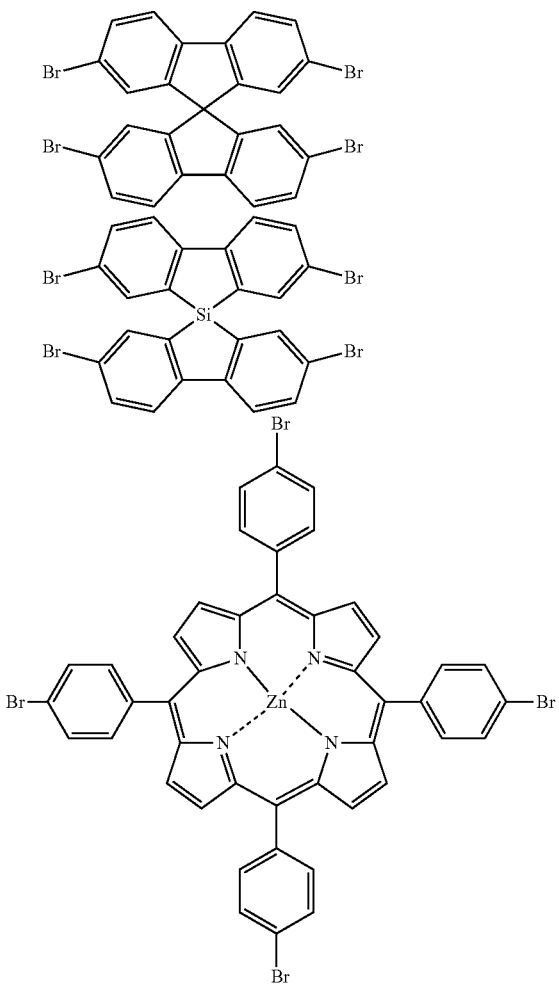

Examples of cross-linkers having non-π-conjugated linking groups include, but are not limited to:

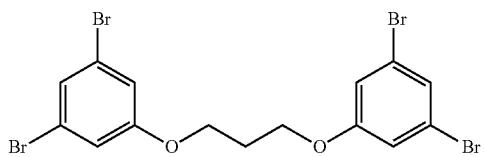

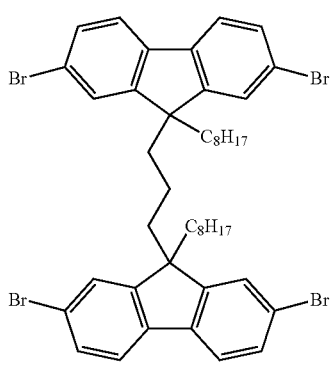

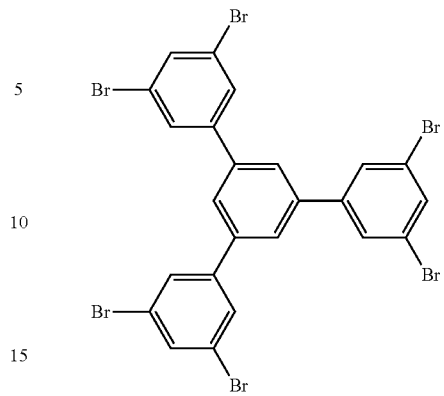

In certain embodiments, where Y is a linking group, the linking group may comprise additional monomeric moieties, $Z_n$. In such embodiments, Y may have a structure according to formula (A) below:

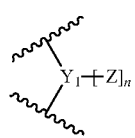

(A)

wherein $Y_1$ is a linking group as defined herein;
Z is a monomeric moiety and is as defined for $Z_1$ or $Z_2$ defined herein; and
n is 1 or more (e.g. 1 or 2).
In an embodiment, n is 1, and the cross-linker may have a structure according to formula (Ic) below:

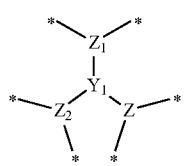

(Ic)

Where $Y_1$ is a π-conjugated linking group, exemplary cross-linkers of this type include, but are not limited to:

Alternatively, where $Y_1$ is an atomic linking group, exemplary cross-linkers of this type include, but are not limited to:

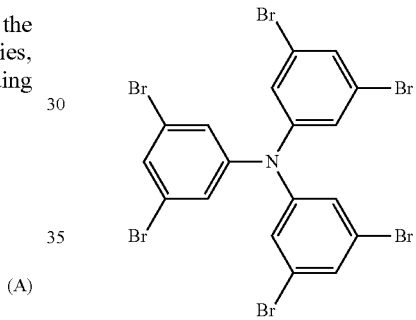

Alternatively, the cross-linker of formula (Ic) may have a different number of covalent attachment points (for attaching to the π-conjugated monomers). For example, the cross-linker may contain 5, 7, 8 or 9 covalent attachment points, as illustrated below:

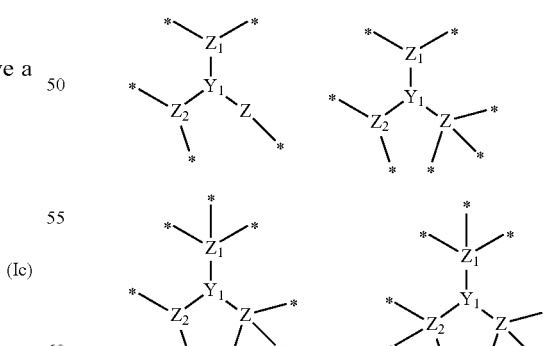

In another embodiment, each of monomeric moieties $Z_1$ and $Z_2$ may be bonded to Y by two separate bonds. Cross-linkers of this type may have a structure according to formula (Id) shown below:

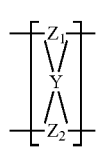

(Id)

In an embodiment, where Y is as defined in formula A, the cross-linker may have a structure according to formula (Id') below:

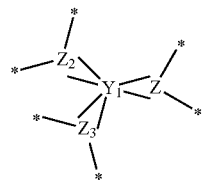

Id' wherein $Y_1$ is a linking group as defined herein; and
Z is a monomeric moiety and is as defined for $Z_1$ or $Z_2$ defined herein.
Where $Y_1$ is an atomic linking group, exemplary cross-linkers of this type include, but are not limited to:

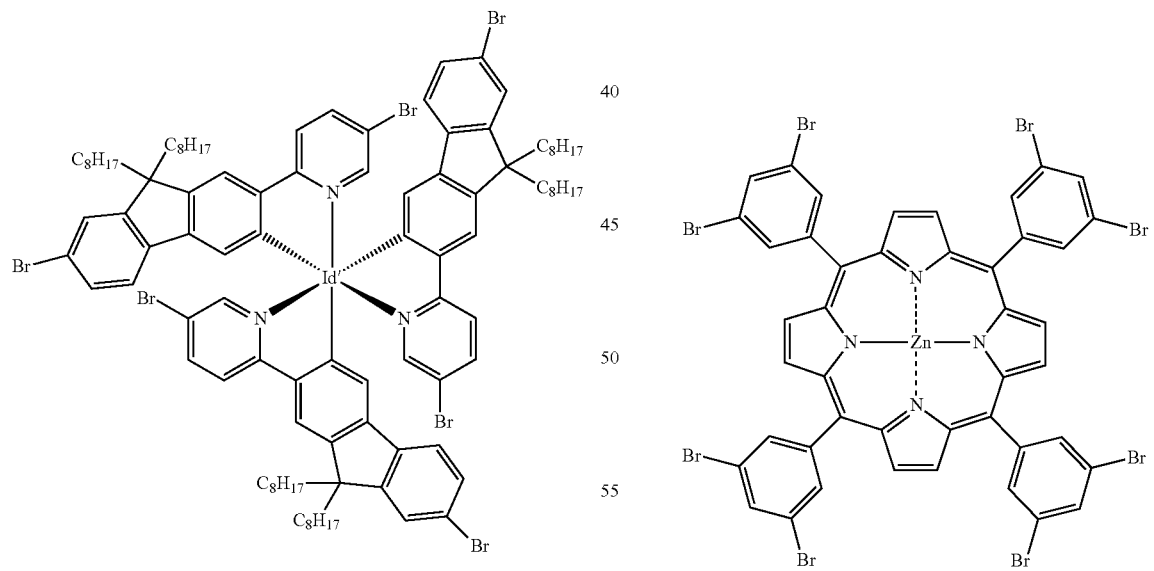

Alternatively, the cross-linker of formula (Id') may have a different number of covalent attachment points (for attaching to the π-conjugated monomers). For example, the cross-linker may contain 4 (wherein Z carries no covalent attachment points), 5, 7, 8 or 9 covalent attachment points.

In an embodiment, Y is as defined in formula (A) and n is 2. In such embodiments, the cross-linker may have a structure according to formula (Ie) below:

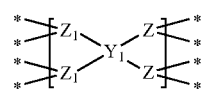

(Ie)

wherein $Y_1$ is a linking group as defined herein; and
each Z is independently a monomeric moiety and is as defined for $Z_1$ or $Z_2$ defined herein.
Where $Y_1$ is a non-π-conjugated linking group, examples of such cross-linkers include, but are not limited to:

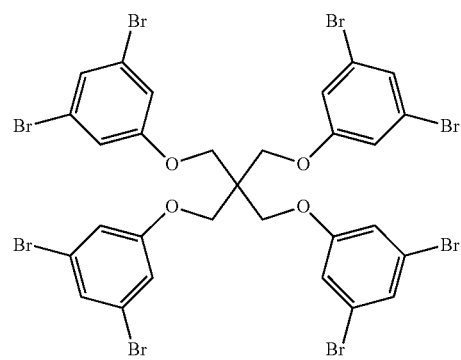

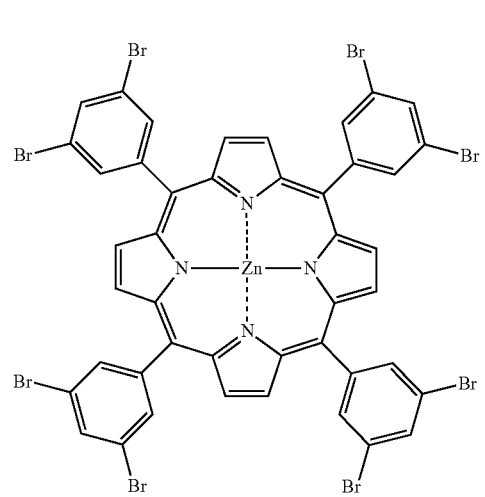

In an embodiment, the nanoparticle composition comprises identical cross-linkers, or a plurality of different cross-linkers.

In another embodiment, when Y is a linking group, said linking group does not comprise additional monomeric moieties Z. In such embodiments, $Z_1$ and $Z_2$ are the only monomeric moieties present within the cross-linker.

In another embodiment, the cross-linker has the formula II shown below:

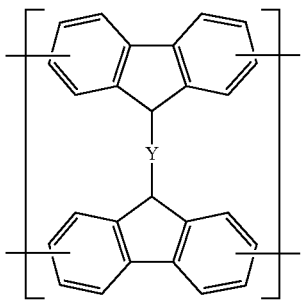

(II)

wherein

Y is absent, a bond, or a linking group.

In an embodiment, Y is absent, such that $Z_1$ is directly linked to $Z_2$, e.g. $Z_1$ is fused to $Z_2$ or is connected thereto by one or more common (shared) atoms (e.g. a spiro carbon atom). Suitably, $Z_1$ is connected to $Z_2$ by a common spiro carbon atom.

In another embodiment, the cross-linker has the formula III shown below:

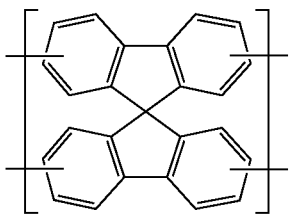

(III)

Suitably, the cross-linker has the following structure:

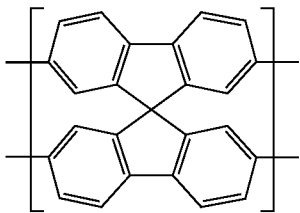

The nanoparticle composition comprises 80-99.9 mol. % of one or more π-conjugated monomers. Any suitable π-conjugated monomers capable of polymerising to form nanoparticles may be used.

In one embodiment, the π-conjugated polymers of the present invention do not comprise any carbon-carbon triple bonds. Thus, in one aspect, the present invention relates to π-conjugated cross-linked polymers that do not comprise any carbon-carbon triple bonds. The electrons in a carbon-carbon triple bond give rise to conformations in which the π-electrons are not fully delocalised.

It will be appreciated by those skilled in the art that the monomeric units used to form the cross-linked π-conjugated polymers may comprise a selection of different chemical moieties that either alone or in combination provide a monomer having a π-conjugated ring system.

Examples of suitable π-conjugated ring systems that may be present in the monomer units, either alone or in any suitable combination, include mono-cyclic aryl groups (e.g. phenyl rings), polycyclic aryl ring systems (e.g. fluorene ring systems, naphthyl rings), mono-cyclic heteroaryl rings (e.g. thiophene rings) or polycyclic heteroaryl ring systems (e.g. benzothiazole, benzodiazathazole rings, thieno[3,2-b]thiophene, or pyrrolo[3,4-c]pyrrole) or other conjugated heterocyclic rings systems (e.g. pyrrolo-pyrrole-1,4-dione rings), and wherein each moiety is optionally substituted by one or more organic groups, e.g. hydrocarbyl substituent groups optionally comprising 1 to 30 carbon atoms and optionally comprising one or more heteroatoms (e.g. N, O, P, S, Si, Ge, As or Se), and, where two or more of such moieties are present, they may be linked together by a bond or via an atom linkage (e.g. such as in a bi-arylamine or tri-arylamine group).

Further examples of particular moieties that may form part or all of the π-conjugated monomers include:

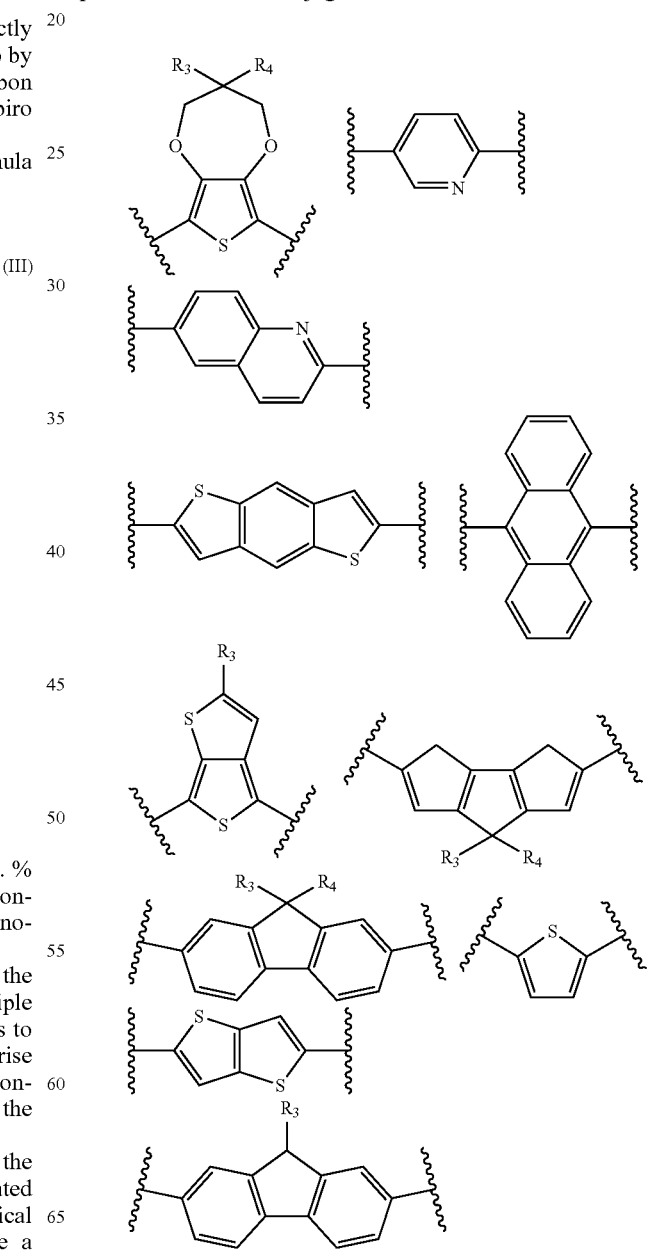

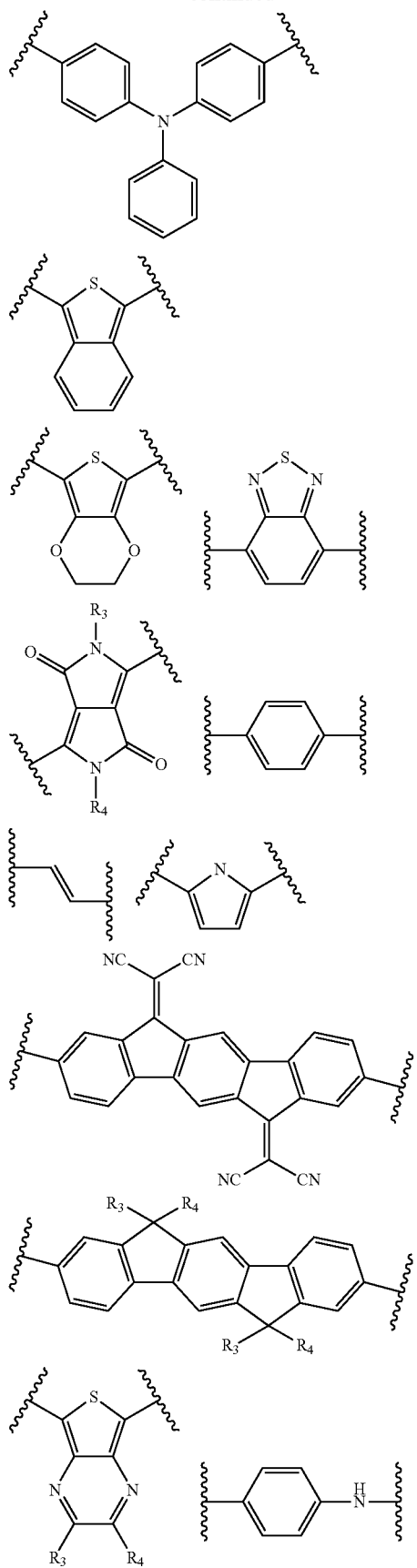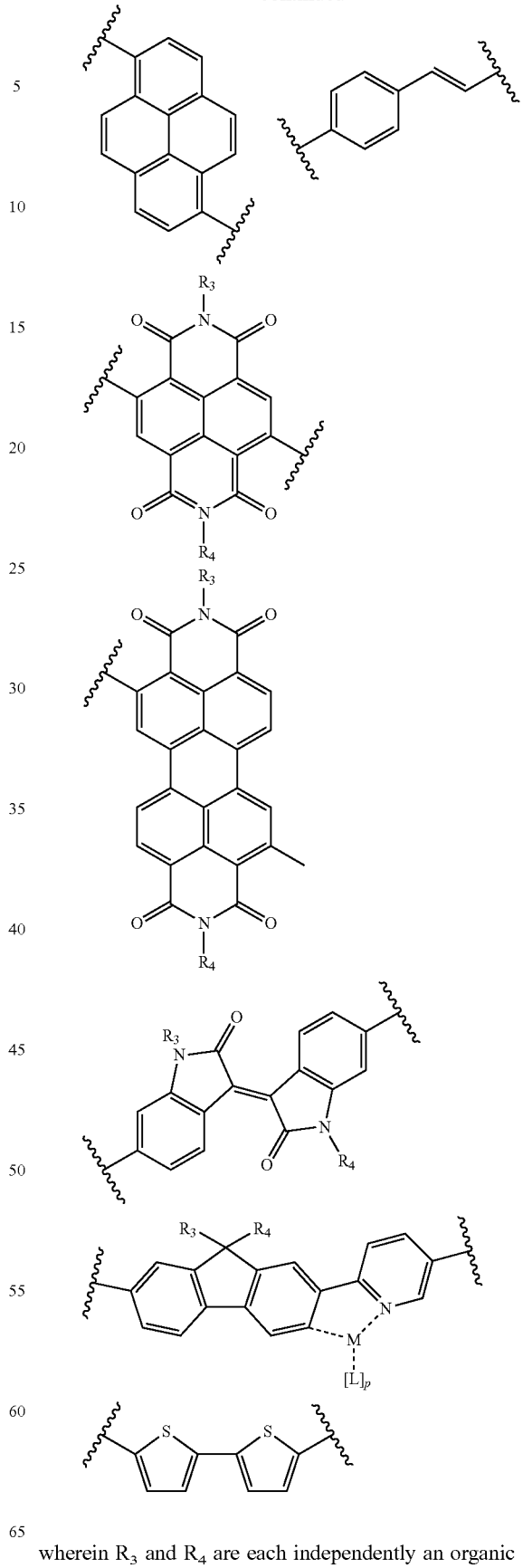
wherein $R_3$ and $R_4$ are each independently an organic substituent group (e.g. a hydrocarbyl substituent group optionally comprising 1 to 30 carbon atoms and optionally comprising one or more heteroatoms (e.g. N, O, P, S, Si, Ge, As or Se), or an aromatic or heteroaromatic group);

M is a metal (e.g. Ir, Pt, Rh, Re, Ru, Os, Cr, Cu, Pd, or Au);

L is a ligand (e.g. a halide or a hydrocarbyl substituent group optionally comprising 1 to 30 carbon atoms and optionally comprising one or more heteroatoms (e.g. N, O, S, Si, or P) or an aromatic or hetroaromatic group);

and wherein each of the above structures is optionally further substituted with one or more organic substituent groups (e.g. a hydrocarbyl substituent groups optionally comprising 1 to 30 carbon atoms and optionally comprising one or more heteroatoms (e.g. N, O, P, S, Si, Ge, As or Se) or an aromatic or heteroaromatic group).

In an embodiment, the π-conjugated monomers each independently comprise a moiety having the formula IV shown below:

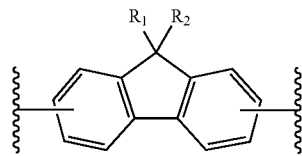

(IV)

wherein $R_1$ and $R_2$ are each independently a group:

—X-Q wherein

X is selected from the group consisting of (1-30C)alkylene, (2-30C)alkenylene, (2-30C)alkynylene, $—[(CH_2)_2—O]_n—$, $—[O—(CH_2)_2]_n—$ and $—[O—Si(R_z)_2]_n$ (wherein $R_z$ is (1-4C)alkyl and n is 1 to 30), and Q is a terminal group selected from hydrogen, methyl, hydroxyl, carboxy, (1-4C)alkoxycarbonyl, amino, $—C=CH_2$, $—C≡CH$, —SH, -biotin, -streptavidin and a polymerisable group selected from acrylates, epoxy and styrene, or $R_1$ and $R_2$ are linked so that, together with the carbon atom to which they are attached, they form a ring.

In another embodiment, π-conjugated monomers each independently have a structure defined by formula V shown below:

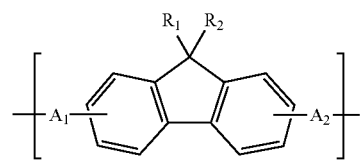

(V)

wherein $R_1$ and $R_2$ are as defined hereinbefore;

$A_1$ and $A_2$ are independently absent or selected from any one of the following moieties:

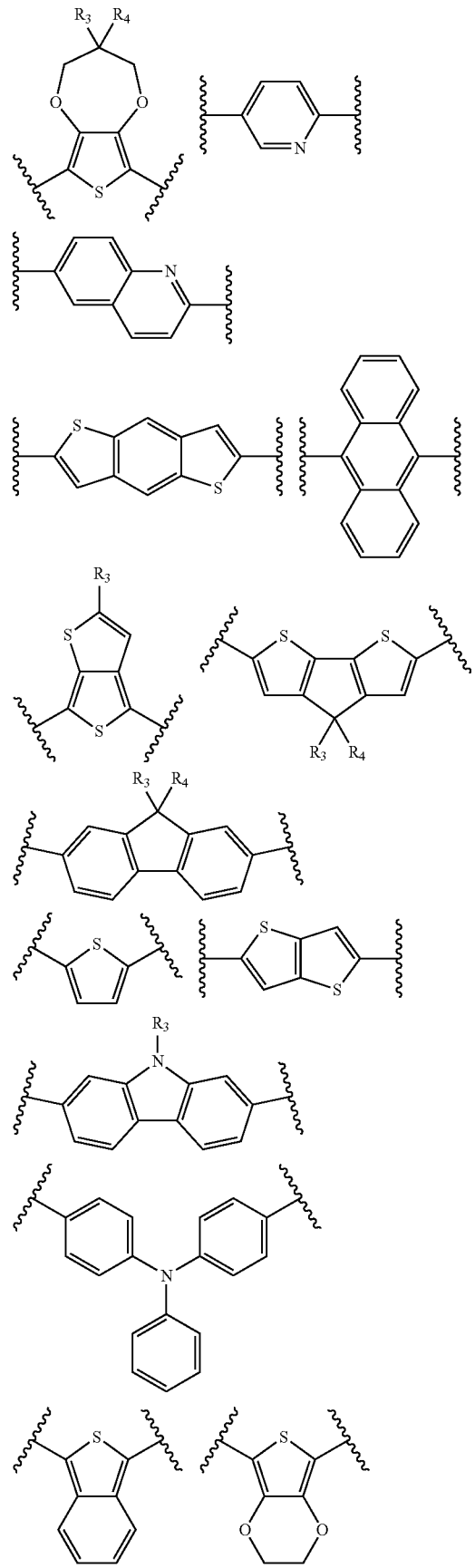

-continued

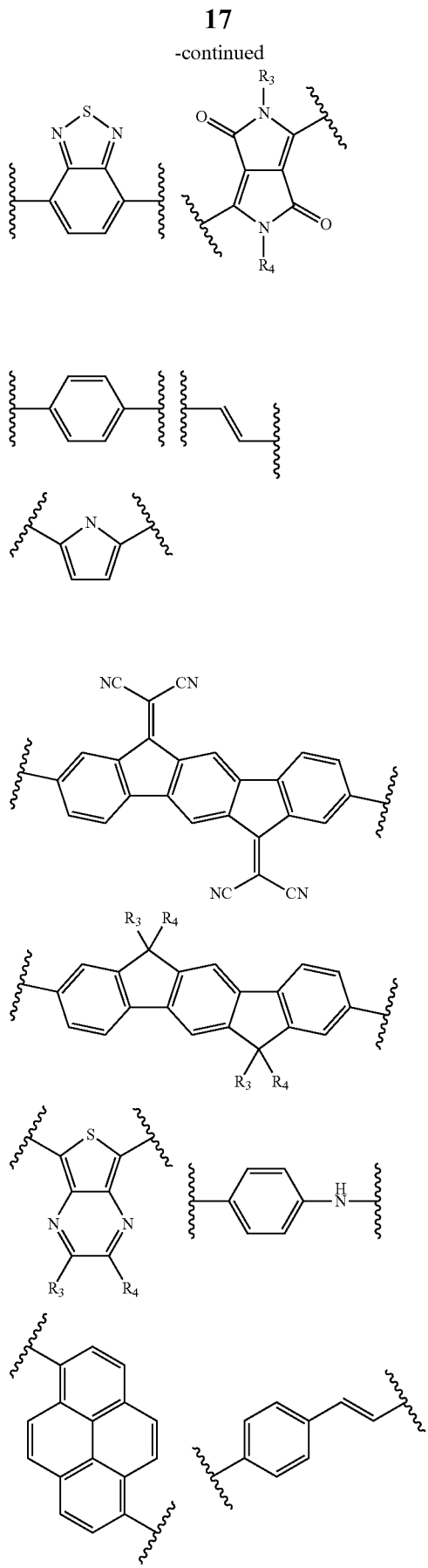

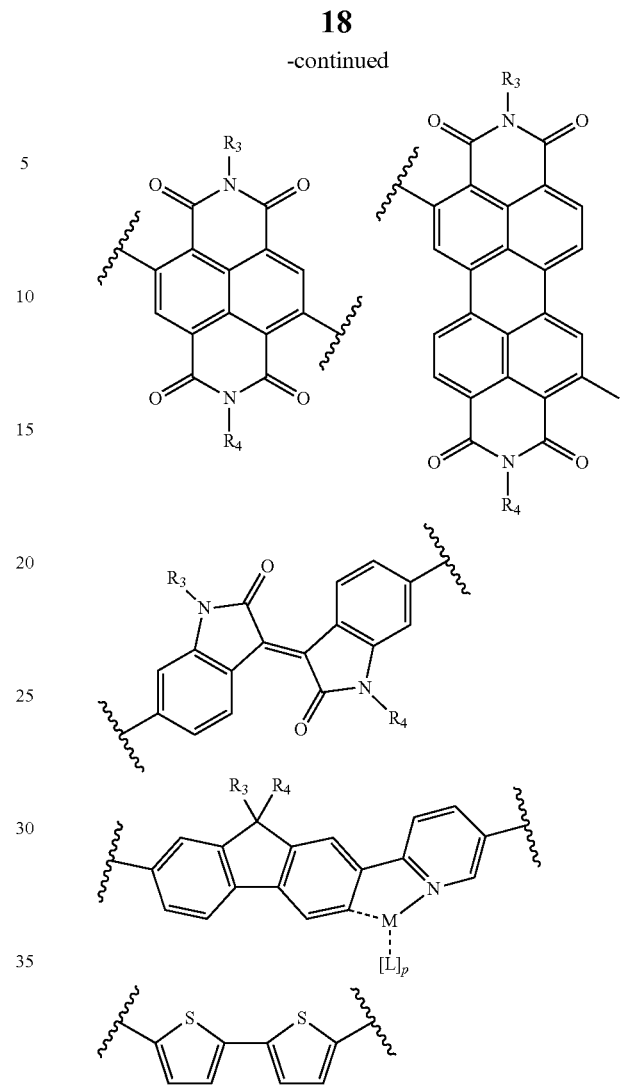

and wherein R₃ and R₄ are each independently a group:

—X¹-Q¹ wherein

X¹ is selected from the group consisting of (1-30C)alkylene, (2-30C)alkenylene, (2-30C)alkynylene, —[(CH₂)₂—O]ₙ—, —[O—(CH₂)₂]ₙ—, and —[O—Si(R_z)₂]ₙ— (wherein R_z is (1-4C)alkyl and n is 1 to 30), Q¹ is a terminal group selected from hydrogen, methyl, hydroxyl, carboxy, (1-4C)alkoxycarbonyl, amino, —C=CH₂, —C≡CH, —SH, -biotin, -streptavidin, and a polymerisable group selected from acrylates, epoxy or styrene;

M is a metal selected from Ir, Pt, Rh, Re, Ru, Os, Cr, Cu, Pd and Au;

L is a ligand independently selected from the group consisting of halo, (1-30C)hydrocarbyl optionally comprising one or more heteroatoms selected from N, O, S, Si, Ge, As or P, or an aryl or heteroaryl group optionally substituted with one or more substituents selected from (1-4C)alkyl, halo, aryl or heteroaryl; and p is 1 to 4.

In another embodiment, the π-conjugated monomers each independently have a structure defined by formula VI below:

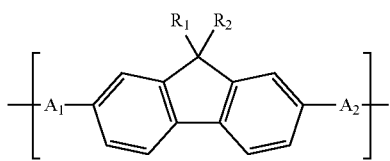

(VI)

$R_1$, $R_2$, $A_1$ and $A_2$ are as defined hereinbefore.

In another embodiment, $A_1$ and $A_2$ are independently absent or selected from any one of the following moieties:

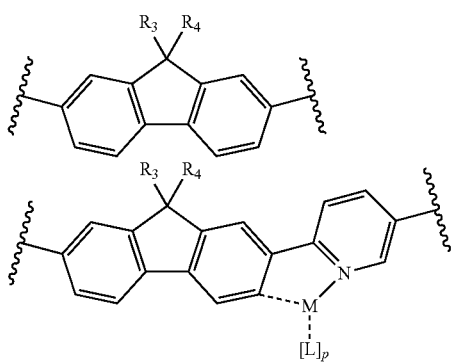

wherein $R_3$, $R_4$, M, L and p are as defined hereinbefore.

In another embodiment both $A_1$ and $A_2$ are absent.

In another embodiment, when present:

X and $X^1$ are independently selected from the group consisting of (1-30C)alkylene, (2-30C)alkenylene, (2-30C)alkynylene, —[(CH$_2$)$_2$—O]$_n$—, —[O—(CH$_2$)$_2$]$_n$— and —[O—Si(R$_z$)$_2$]$_n$— (wherein R$_z$ is methyl and n is 1 to 30);

Q and $Q^1$ are independently a terminal group selected from hydrogen, methyl, hydroxyl, carboxy, (1-4C)alkoxycarbonyl, amino, —C=CH$_2$, —C≡CH and a polymerisable group selected from acrylates, epoxy and styrene;

M is a metal selected from Ir, Pt, Rh, Re, Ru, Os, Cr, Cu, Pd and Au;

L is a ligand independently selected from the group consisting of halo, (1-30C)hydrocarbyl optionally comprising one or more heteroatoms selected from N, O, S, Si or P, or an aryl or heteroaryl group optionally substituted with one or more substituents selected from (1-4C)alkyl, halo, aryl or heteroaryl; and p is 1 to 4

In another embodiment, when present:

X and $X^1$ are independently selected from the group consisting of (1-20C)alkylene, (2-20C)alkenylene, (2-20C)alkynylene, —[(CH$_2$)$_2$—O]$_n$— and —[O—(CH$_2$)$_2$]$_n$— (wherein n is 1 to 20);

Q and $Q^1$ are independently a terminal group selected from hydrogen, methyl, hydroxyl, carboxy, (1-4C)alkoxycarbonyl, amino, —C=CH$_2$ and —C≡CH.

M is a metal selected from Ir, Pt, Cr, Cu, Pd and Au;

L is a ligand independently selected from the group consisting of halo, (1-20C)hydrocarbyl optionally comprising one or more heteroatoms selected from N, O, or S, or an aryl or heteroaryl group optionally substituted with one or more substituents selected from (1-4C)alkyl, halo, aryl or heteroaryl; and p is 1 to 4.

In another embodiment, when present:

X and $X^1$ are independently selected from the group consisting of (1-20C)alkylene, —[(CH$_2$)$_2$—O]$_n$— and —[O—(CH$_2$)$_2$]$_n$— (wherein n is 1 to 20);

Q and $Q^1$ are independently a terminal group selected from hydrogen, methyl, hydroxyl, carboxy, (1-4C)alkoxycarbonyl and amino;

M is a metal selected from Ir, Pt, Cr, Cu, Pd and Au;

L is a ligand independently selected from the group consisting of aryl or heteroaryl, optionally substituted with one or more substituents selected from (1-4C)alkyl, halo, aryl or heteroaryl; and p is 1 to 4.

In another embodiment, when present:

X and $X^1$ are independently selected from the group consisting of (1-20C)alkylene, —[(CH$_2$)$_2$—O]$_n$— and —[O—(CH$_2$)$_2$]$_n$— (wherein n is 1 to 20);

Q and $Q^1$ are independently a terminal group selected from hydrogen, methyl, (1-2C)alkoxycarbonyl and hydroxyl;

M is Ir;

L is a ligand independently selected from the group consisting of aryl or heteroaryl, optionally substituted with one or more substituents selected from aryl or heteroaryl; and p is 1 to 2.

In another embodiment, when present:

X and $X^1$ are independently selected from the group consisting of (4-12C)alkylene, —[(CH$_2$)$_2$—O]$_n$— and —[O—(CH$_2$)$_2$]$_n$— (wherein n is 1 to 15);

Q and $Q^1$ are independently a terminal group selected from hydrogen, methyl, (1-2C)alkoxycarbonyl and hydroxyl;

M is Ir;

L is a ligand independently selected from the group consisting of phenyl or 6-membered heteroaryl, optionally substituted with one or more substituents selected from phenyl or 6-membered heteroaryl; and p is 1 to 2.

In another embodiment, when present:

X and $X^1$ are independently selected from the group consisting of (4-12C)alkylene and —[(CH$_2$)$_2$—O]$_n$— (wherein n is 1 to 15);

Q and $Q^1$ are independently a terminal group selected from hydrogen, (1-2C)alkoxycarbonyl and methyl;

M is Ir;

L is a ligand independently selected from the group consisting of phenyl or 6-membered heteroaryl, optionally substituted with one or more substituents selected from phenyl or 6-membered heteroaryl; and p is 1 to 2

In any of the embodiments mentioned hereinbefore, X and/or $X^1$ may also be —(CH$_2$)$_m$(CF$_2$)$_n$— (wherein m is 0 to 30 and n is 1 to 30) and Q and/or $Q^1$ may also be —CF$_3$.

In another embodiment, the π-conjugated monomers are each independently selected from any of the following structures:

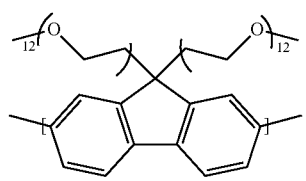

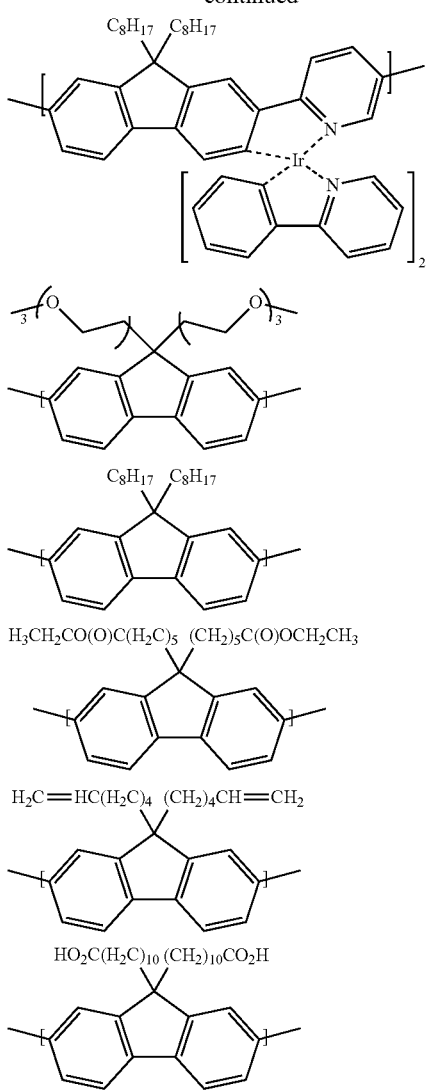

In another embodiment, the π-conjugated monomers are each independently selected from any of the following structures:

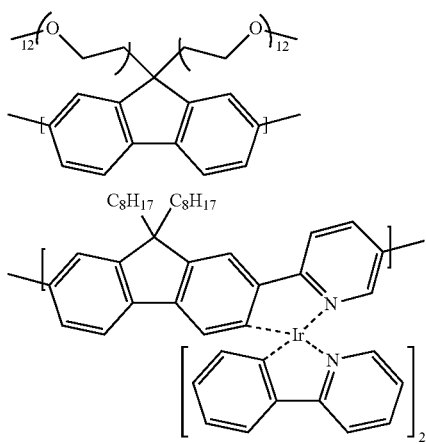

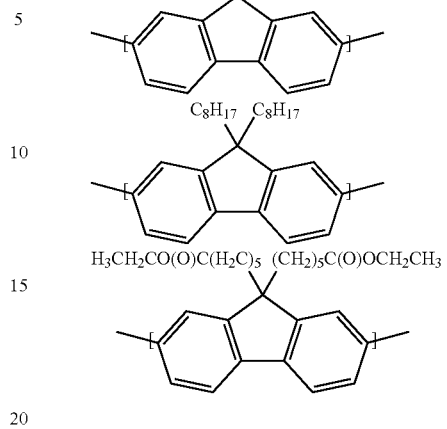

In another embodiment, the nanoparticle composition is an aqueous suspension. The aqueous medium provides a water-based vehicle in which the nanoparticles are dispersed. The medium may comprise additional components, such as dissolved materials and other water-miscible solvents. Suitably, the aqueous medium is water. More suitably, the aqueous medium is purified water.

In another embodiment, the nanoparticles forming the nanoparticle composition have a particle size (Z-average, measured by DLS) of 20-400 nm. Suitably, the nanoparticles forming the nanoparticle composition have a particle size of 30-400 nm. More suitably, the nanoparticles have a particle size of less than 30-300 nm. Even more suitably, the nanoparticles have a particle size of less than 30-250 nm. Even more suitably, the nanoparticles have a particle size of less than 30-200 nm. Most suitably, the nanoparticles have a particle size of less than 30-100 nm.

In another embodiment, the nanoparticles forming the nanoparticle composition have a particle size of 20-400 nm. More suitably, the nanoparticles have a particle size of less than 20-300 nm. Even more suitably, the nanoparticles have a particle size of less than 20-250 nm. Even more suitably, the nanoparticles have a particle size of less than 20-200 nm. Most suitably, the nanoparticles have a particle size of less than 20-100 nm.

In another embodiment, the nanoparticles forming the nanoparticle composition have a particle size of 10-400 nm. More suitably, the nanoparticles have a particle size of less than 10-300 nm. Even more suitably, the nanoparticles have a particle size of less than 10-250 nm. Even more suitably, the nanoparticles have a particle size of less than 10-200 nm. Most suitably, the nanoparticles have a particle size of less than 10-100 nm.

In another embodiment, the polymers forming part of the present invention have a degree of polymerisation of 10 to 800, more suitably 20 to 600.

In another embodiment, the nanoparticle composition comprises 1-10 mol % of the cross linker. Suitably, the nanoparticle composition comprises 2-8 mol % of the cross linker. More suitably, the nanoparticle composition comprises 3-7 mol % of the cross linker. Most suitably, the nanoparticle composition comprises 4.5-5.5 mol % of the cross linker.

In another embodiment, the nanoparticle composition of the invention may further comprise a stabiliser to maintain the particles in suspension. Any suitable stabiliser may be used such as, for example, non-ionic, cationic or anionic stabilisers known in the art. Particular examples of suitable stabilisers include non-ionic stabilisers, for example: Triton X series octylphenol ethoxylates, Tergitol series nonylphenol ethoxylates (Dow Chemical Company); Brij series poly (oxyethylene) glycol alkyl ethers, Superonic series, Tween series polysorbate surfactants (Croda); Pluronic series of block copolymers based on ethylene oxide and propylene oxide (BASF); Tetronic series tetra functional block copolymers based on ethylene oxide and propylene oxide, Lutensol series (BASF); Igepal series Rhodasurf series and Antarox series (Rhodia); and Merpol series (Stepan Co.)

In another embodiment, the nanoparticle composition further comprises an anionic stabiliser, for example sodium dodecylsulphate (SDS), and/or a cationic stabiliser, for example cetyl trimethylammonium bromide (CTAB).

Dispersions of the Invention

As discussed hereinbefore, the present invention also provides a nanoparticle dispersion comprising a nanoparticle composition as defined herein dispersed throughout a dispersing medium.

In an embodiment, the dispersing medium is a liquid (e.g. water or a solution of monomers). Aqueous dispersing media may be particularly suitable where the dispersion is intended for biological applications.

Alternatively, the dispersing medium may be a solid (e.g. a polymeric matrix). Dispersions where the dispersing medium is a polymeric matrix may be particularly suitable for use as LED phosphors.

In another embodiment, the nanoparticle dispersions are prepared such that the loading of nanoparticle composition is high. Suitably, the concentration of the nanoparticles in the dispersing medium is greater than or equal to 15 mM. More suitably, the concentration of the nanoparticles in the dispersing medium is greater than or equal to 20 mM. Suitably, the concentration of the nanoparticles in the dispersing medium is greater than or equal to 25 mM. The aforementioned concentrations are based on the initial monomer concentrations used in the polymerisation reaction, and assumes 100% conversion of the monomers to the polymer.

Alternatively, depending on the application of interest, the nanoparticle dispersion may be more dilute. In an embodiment, the concentration of the nanoparticles in the dispersing medium (e.g. water) is less than or equal to 15 mg/ml. Such dispersions may be particularly useful in biological applications.

In an alternative embodiment, the concentration of the nanoparticles in the dispersing medium (e.g. a polymeric matrix) is less than or equal to 5 wt %. Suitably, the concentration of the nanoparticles in the dispersing medium is less than or equal to 3 wt %. More suitably, the concentration of the nanoparticles in the dispersing medium is less than or equal to 1 wt %. Such dispersions may find application where the nanoparticles are being used as LED phosphors.

Methods of the Invention

As discussed hereinbefore, the present invention also provides a method of forming a nanoparticle composition defined herein, the method comprising the step of forming the nanoparticles by emulsion polymerisation, miniemulsion polymerisation or dispersion polymerisation techniques to provide an aqueous suspension of nanoparticles.

Emulsion polymerisation, miniemulsion polymerisation and dispersion polymerisation techniques will be known to one of skill in the art.

In the case of emulsion polymerisation, the monomeric components are dissolved in a suitable organic solvent (e.g. chlorobenzene, toluene or xylenes) along with the catalyst (e.g. $Pd(PPh_3)_4$, $IPr*PdTEACl_2$ or $Pd_2(dba)_3/P(o\text{-tol})_3$). This solution is then added to an aqueous medium of water, tetraethylammonium hydroxide solution (40% in water) and a suitable emulsifier. Any suitable emulsifier may be used, such as, for example, SDS, Triton X102, Brij L23, and/or Tween 20. The resultant emulsion may be stirred and/or ultrasonicated to form an emulsion, suitably a mini-emulsion. The emulsion mixture may then be gently heated to a temperature of between 30 and 100° C. (for $Pd(PPh_3)_4$, $Pd_2(dba)_3/P(o\text{-tol})_3$ suitably between 70 and 95° C., and more suitably between 80 and 95° C.; and for $IPr*PdTEACl_2$ ideally 30° C.) for period of time (e.g. from 1 hour to 2 days) to form the polymeric nanoparticles. A person skilled in the art will appreciate that the temperature of heating depends on catalyst system employed (as per the example section herein).

In an embodiment, the nanoparticles are formed by Suzuki coupling or Stille coupling reactions. Such coupling reactions are known in the art.

In another embodiment, the nanoparticles are formed by reacting 7-monomeric moieties as defined herein with a pre-made cross-linking moiety as defined herein.

In another embodiment, the method further comprises the step of purifying the aqueous suspension of nanoparticles. Suitably, the aqueous suspension of nanoparticles is purified by contacting the aqueous suspension of nanoparticles with at least one organic solvent.

In another embodiment, contacting the aqueous suspension of nanoparticles with at least one suitable organic solvent causes precipitation of the nanoparticles. The precipitated nanoparticles may then be centrifuged, with the supernatant then decanted to leave the purified nanoparticles. Optionally, the purified nanoparticle may be resuspended in water, and the purification process then repeated.

In another embodiment, when the nanoparticles are lipophilic, the at least one organic solvent is a polar solvent that is miscible with water (e.g. methanol).

In another embodiment, when the nanoparticles are hydrophilic, the at least one organic solvent is a non-polar solvent.

Uses of the Nanoparticle Compositions

As discussed hereinbefore, the present invention also provides a use of a nanoparticle composition defined herein in one or more applications selected from the group consisting of biological or non-biological imaging or sensing, down-conversion of LED light, anti-counterfeit encoding, displays, cell-sorting/flow cytometry, long-term cell tracking, and flow visualisation.

In an embodiment, the nanoparticle composition is used in in vivo or in vitro imaging or sensing applications.

EXAMPLES

Examples of the invention will now be described, for the purpose of reference and illustration only, with reference to the accompanying figures, in which.

EXAMPLE 1

Cross-Linked PFO Nanoparticles

Synthesis

Referring to Scheme 1 and Table 1 shown below, sodium dodecyl sulphate (SDS) (50.0 mg) and deionised water (10 mL) were transferred to a Schlenk tube and the resultant solution was degassed by bubbling with argon for 20 minutes. Monomer A (see Table 1), crosslinker B (see Table 1) and monomer C (58.6 mg, $9.12 \times 10^{-2}$ mmol) were dissolved in toluene (1 mL), to which hexadecane (78 μL) was also added, and this solution was degassed for 5 minutes in the same manner. Tetrakis(triphenylphosphine)palladium(0) (2.2 mg, $9.13 \times 10^{-3}$ mmol) was added to the monomer solution, which was then transferred to the reaction vessel. The reaction mixture was emulsified by ultrasonication (Cole Parmer 750 W ultasonicator, fitted with microtip, on 22% power) for 2 minutes while cooling with an ice bath. The Schlenk tube was resealed and the miniemulsion was heated to 72° C., followed by addition of 1M aqueous sodium hydroxide solution (365 μL), and the reaction mixture was stirred for 16 hours. After cooling to room temperature, the cap of the reaction vessel was removed and the emulsion was stirred for 5 hours to remove the residual toluene.

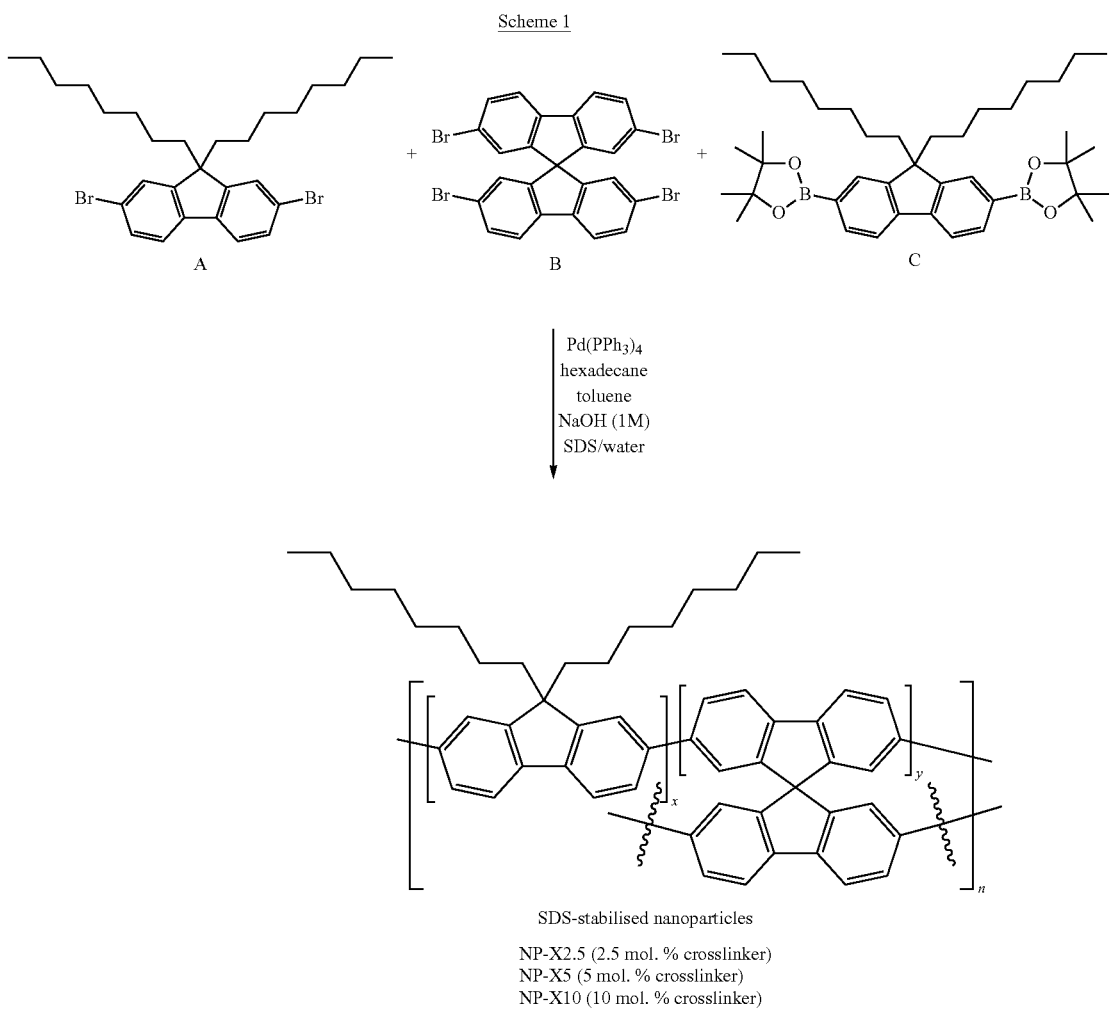

Scheme 1

SDS-stabilised nanoparticles

NP-X2.5 (2.5 mol. % crosslinker)
NP-X5 (5 mol. % crosslinker)
NP-X10 (10 mol. % crosslinker)

TABLE 1

Reaction variables for synthesis of cross-linked PFO nanoparticles

| Sample Name | Monomer A (mass, moles) | Crosslinker B (mass, moles) |
|---|---|---|
| NP-X2.5 | 45.0 mg<br>$8.21 \times 10^{-2}$ mmol | 2.9 mg<br>$4.6 \times 10^{-3}$ mmol |
| NP-X5 | 40.0 mg<br>$7.29 \times 10^{-2}$ mmol | 5.8 mg<br>$9.1 \times 10^{-3}$ mmol |
| NP-X10 | 30.0 mg<br>$5.47 \times 10^{-2}$ mmol | 11.6 mg<br>$1.82 \times 10^{-2}$ mmol |

Surfactant Removal and DLS Analysis (Nanoparticles in Water)

Figure 1:
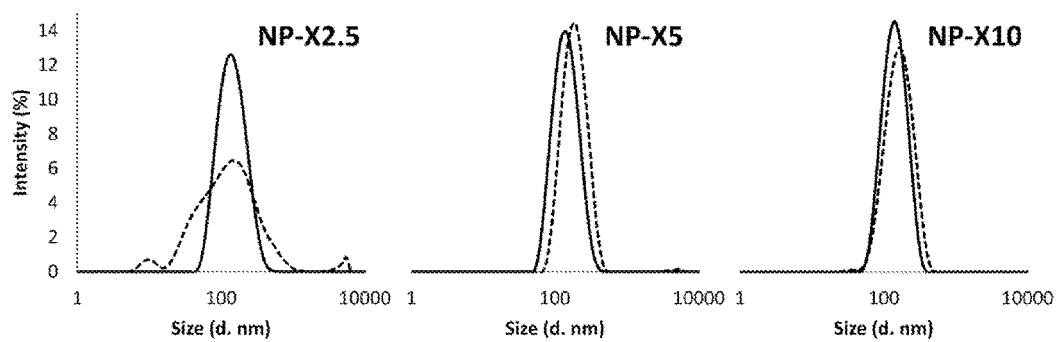
FIG. 1 shows DLS particle size histograms of the cross-linked nanoparticles of Example 1 in water (solid line) or THF (broken line).

A 400 µL aliquot of the crude nanoparticle suspension was diluted with 1.6 mL of deionised water, to which Amberlite XAD-2 resin (20 mg, pre-washed with 2×2 mL of water) was added. The suspension was shaken at room temperature for 15 minutes before decanting off the nanoparticle suspension. This Amberlite XAD-2 purification step was repeated, after which time the suspension no longer foamed upon shaking and was filtered through glass wool prior to dynamic light scattering (DLS) analysis of particle size using a Malvern Zetasizer Nano ZS. Results are shown in Table 2 and FIG. 1.

TABLE 2

DLS analysis of cross-linked PFO nanoparticles in water

| Sample Name | Z-Average (d · nm) | Size by Intensity (d · nm) | St. Dev. (nm) | PdI |
|---|---|---|---|---|
| NP-X2.5 | 128 | 154 | 69 | 0.16 |
| NP-X5 | 130 | 151 | 60 | 0.14 |
| NP-X10 | 129 | 150 | 56 | 0.13 |

DLS Analysis (Nanoparticles in THF)

A 200 µL aliquot of the crude nanoparticle suspension was flocculated through addition of 1.3 mL toluene and the polymer was isolated by centrifugation (14,000 rpm, 1 minute) and decantation of the supernatant. The polymer was dried in air to remove residual methanol before dissolving in tetrahydrofuran (THF, 1 mL). The resultant suspension was measured directly using a Malvern Zetasizer Nano ZS. Results are shown in Table 3 and FIG. 1.

TABLE 3

DLS analysis of cross-linked PFO nanoparticles in THF

| Sample name | Z-Average (d · nm) | Size by Intensity (d · nm) | St. Dev. (nm) | PdI |
|---|---|---|---|---|
| NP-X2.5 | — | — | — | n/a[a] |
| NP-X5 | 174 | 198 (99.6%)<br>4827 (0.4%)[b] | 74 (99.6%)<br>711 (0.4%)[a] | 0.13 |
| NP-X10 | 147 | 175 | 73 | 0.15 |

[a]secondary peak likely to result from a small proportion of aggregated nanoparticles UV/Vis Analysis (Nanoparticles in Water or THF)

Figure 2:
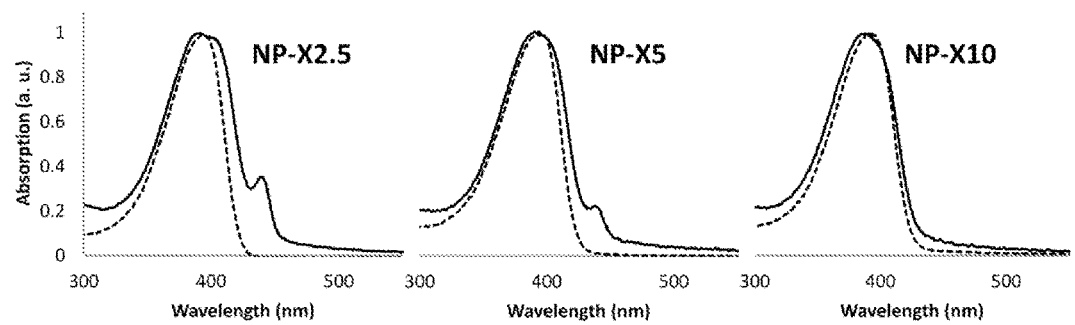
FIG. 2 shows UV/Vis spectra of the cross-linked nanoparticles of Example 1 in water (solid line) or THF (broken line).
Figure 3:
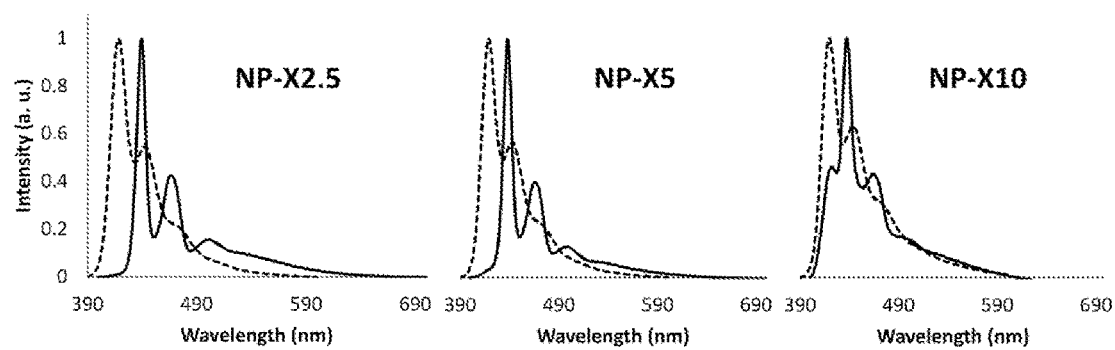
FIG. 3 shows PL spectra of the cross-linked nanoparticles of Example 1 in water (solid line) or THF (broken line).

Following surfactant removal via treatment with Amberlite XAD-2, 40 µL of the nanoparticle suspension was diluted with 3 mL of water. UV-Vis absorption spectra of the nanoparticles at this concentration were recorded on a Varian Cary 55 5000UV-Vis-NIR spectrophotometer at room temperature. FIG. 2 shows UV/Vis spectra of the cross-linked PFO nanoparticles.

Photoluminescence (PL) Analysis (Nanoparticles in Water or THF)

Following surfactant removal via treatment with amberlite XAD-2, 40 µL of the nanoparticle suspension was diluted with 3 mL of water. PL spectra were recorded on a Varian Cary Eclipse fluorimeter. FIG. 2 shows PL spectra of the cross-linked PFO nanoparticles Photoluminescence (PL) Analysis (Nanoparticles in Water)

Photoluminescencemeasurements were obtained using a Fluoromax-4 spectrofluorometer. Measurements were carried out on dilute dispersions of the nanoparticles in water (800 µL, abs>1), using the same volume of water for background measurements. The results are provided in Table 4.

TABLE 4

Optical properties of PFO nanoparticles in water

| Sample Name | $\lambda_{max}$ | $\lambda_{em}$[a] |
|---|---|---|
| NP-X2.5 | 390 | 440 |
| NP-X5 | 390 | 438 |
| NP-X10 | 390 | 437 |

[a]$\lambda_{ex}$ = 380 nm

EXAMPLE 2

Ethyl Ester-Functionalised Cross-Linked PFO Nanoparticles

Synthesis

Referring to Scheme 2 shown below, sodium dodecyl sulfate (50.0 mg) and deionised water (10 mL) were transferred to a Schlenk tube and the resultant solution was degassed by bubbling with argon for 20 minutes. Crosslinker A (5.8 mg, $9.12 \times 10^{-3}$ mmol), monomer B (44.4 mg, $7.30 \times 10^{-2}$ mmol) and monomer C (58.6 mg, $9.12 \times 10^{-2}$ mmol) were dissolved in toluene (1 mL), to which hexadecane (78 µL) was also added, and this solution was degassed for 5 minutes in the same manner. Tetrakis(triphenylphosphine)palladium(0) (2.2 mg, $9.13 \times 10^{-3}$ mmol) was added to the monomer solution, which was then transferred to the reaction vessel. The reaction mixture was emulsified by ultrasonication (Cole Parmer 750 W ultasonicator, fitted with microtip, on 22% power) for 2 minutes while cooling with an ice bath. The Schlenk tube was resealed and the mini-emulsion was heated to 72° C., followed by addition of 1M aqueous sodium hydroxide solution (365 µL), and the reaction mixture was stirred for 16 hours. After cooling to room temperature, the cap of the reaction vessel was removed and the emulsion was stirred for 5 hours to remove the residual toluene.

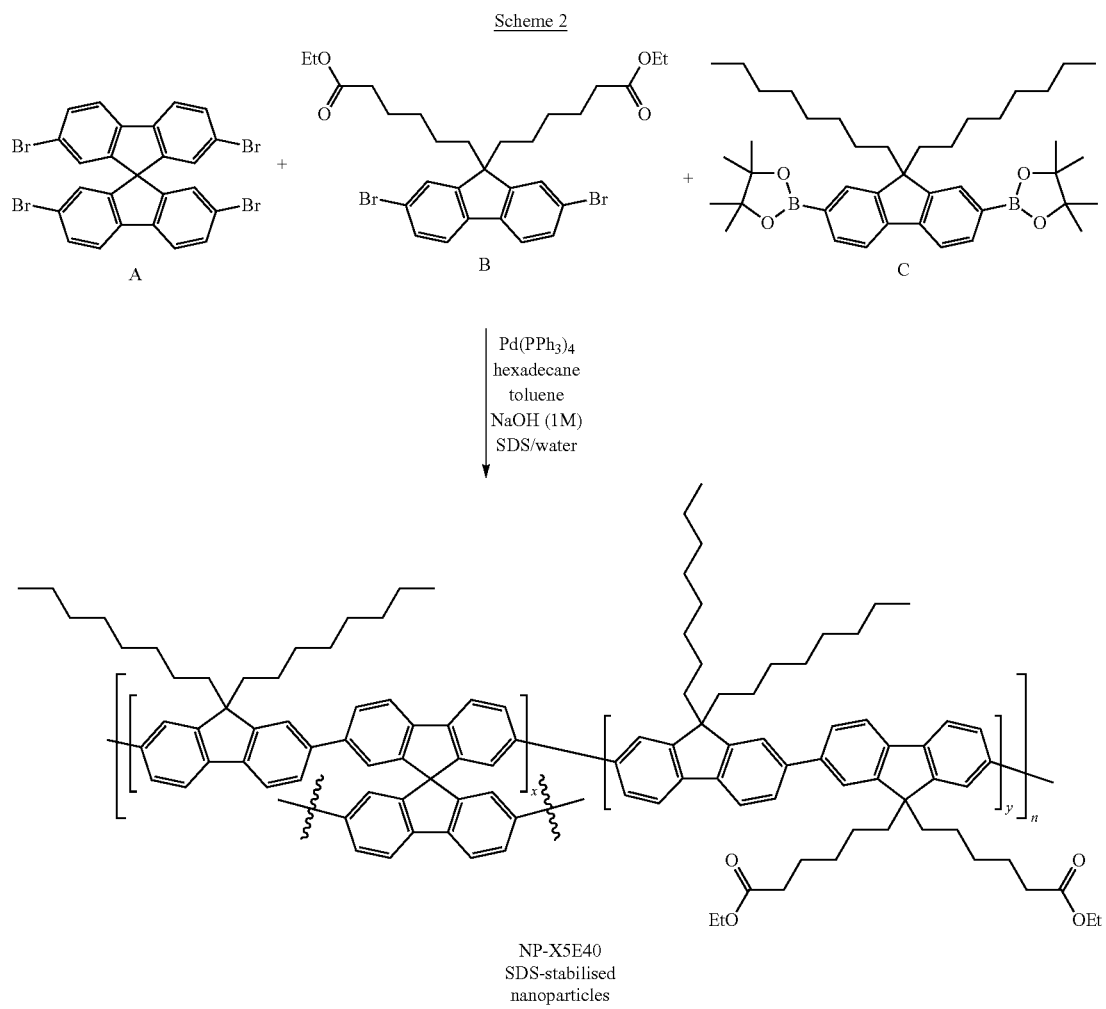

Scheme 2

NP-X5E40
SDS-stabilised
nanoparticles

DLS Analysis (Nanoparticles in Water or THF)

Figure 4:
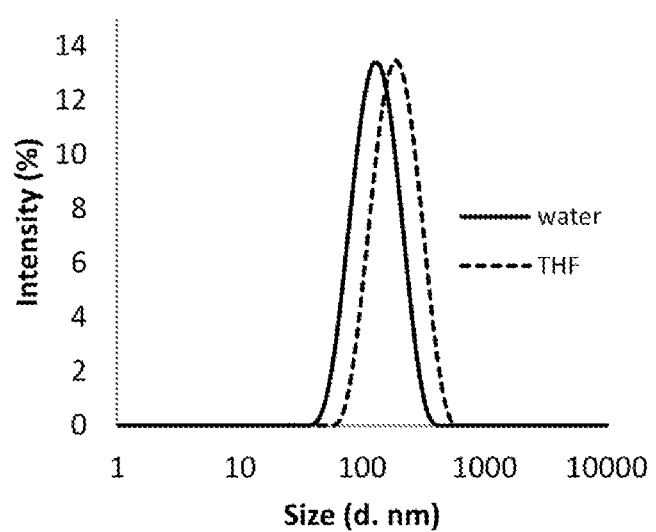
FIG. 4 shows DLS particle size histograms of the cross-linked nanoparticles of Example 2 in water (solid line) and THF (broken line) dispersants.

Surfactant removal was carried out using the general procedure described in Example 1. Flocculation and resuspension in THF were carried out using the general procedure described in Example 1. DLS analysis was carried out as in Example 1, using either water or THF as the dispersant. The results are provided in Table 5 and FIG. 4.

TABLE 5

DLS analysis of ethyl ester-functionalised nanoparticles in water or THF

| Sample Name | Dispersant | Z-Average (d · nm) | Size by Intensity (d · nm) | St. Dev (nm) | PdI |
|---|---|---|---|---|---|
| NP-X5E40 | Water | 118 | 139 | 56 | 0.14 |
| NP-X5E40 | THF | 170 | 204 | 82 | 0.16 |

Vis and PL Analysis (Nanoparticles in Water)

Figure 5:
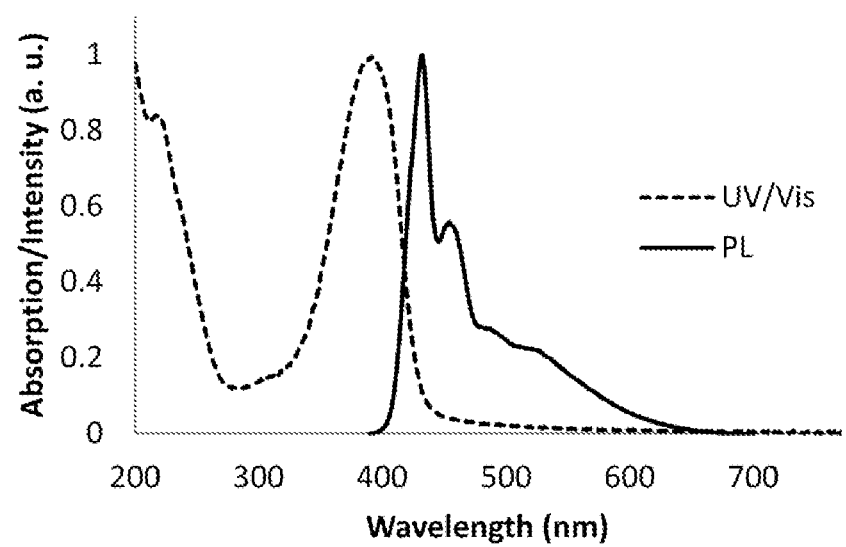
FIG. 5 shows UV/Vis (broken line) and PL (solid line) spectra of the cross-linked nanoparticles of Example 2.

The general UV/Vis and PL analytical procedures described in Example 1 were used to record the UV/Vis and PL spectra of the nanoparticles in dilute aqueous dispersion. The results are provided in FIG. 5.

PL Analysis (Nanoparticles in Water)

PL measurements were obtained using the general method described in Example 1. The results are provided in Table 6.

TABLE 6

Optical properties of ethyl ester-functionalised nanoparticles in water

| Sample Name | $\lambda_{max}$ | $\lambda_{em}$ [a] |
|---|---|---|
| NP-X5E40 | 391 | 432 |

[a] $\lambda_{ex}$ = 380 nm

EXAMPLE 3

Cross-Linked Phosphorescent Nanoparticles

Method

Referring to Scheme 3 and Table 7 shown below, sodium dodecyl sulfate (50.0 mg) and deionised water (10 mL) were transferred to a Schlenk tube and the resultant solution was degassed by bubbling with argon for 20 minutes. Monomers A (see Table 7), C (20.5 mg, $1.82 \times 10^{-2}$ mmol) and D (58.6 mg, $9.12 \times 10^{-2}$ mmol) and crosslinker B (5.8 mg, $9.12 \times 10^{-3}$ mmol) were dissolved in toluene (1 mL), to which hexadecane (78 μL) was also added, and this solution was degassed for 5 minutes in the same manner. Tetrakis(triphenylphosphine)palladium(0) (2.2 mg, $9.13 \times 10^{-3}$ mmol) was added to the monomer solution, which was then transferred to the reaction vessel. The reaction mixture was emulsified by ultrasonication (Cole Parmer 750 W ultasonicator, fitted with microtip, on 22% power) for 2 minutes while cooling with an ice bath. The Schlenk tube was resealed and the miniemulsion was heated to 72° C., followed by addition of 1M aqueous sodium hydroxide solution (365 μL), and the reaction mixture was stirred for 16 hours. After cooling to room temperature, the cap of the reaction vessel was removed and the emulsion was stirred for 5 hours to remove the residual toluene.

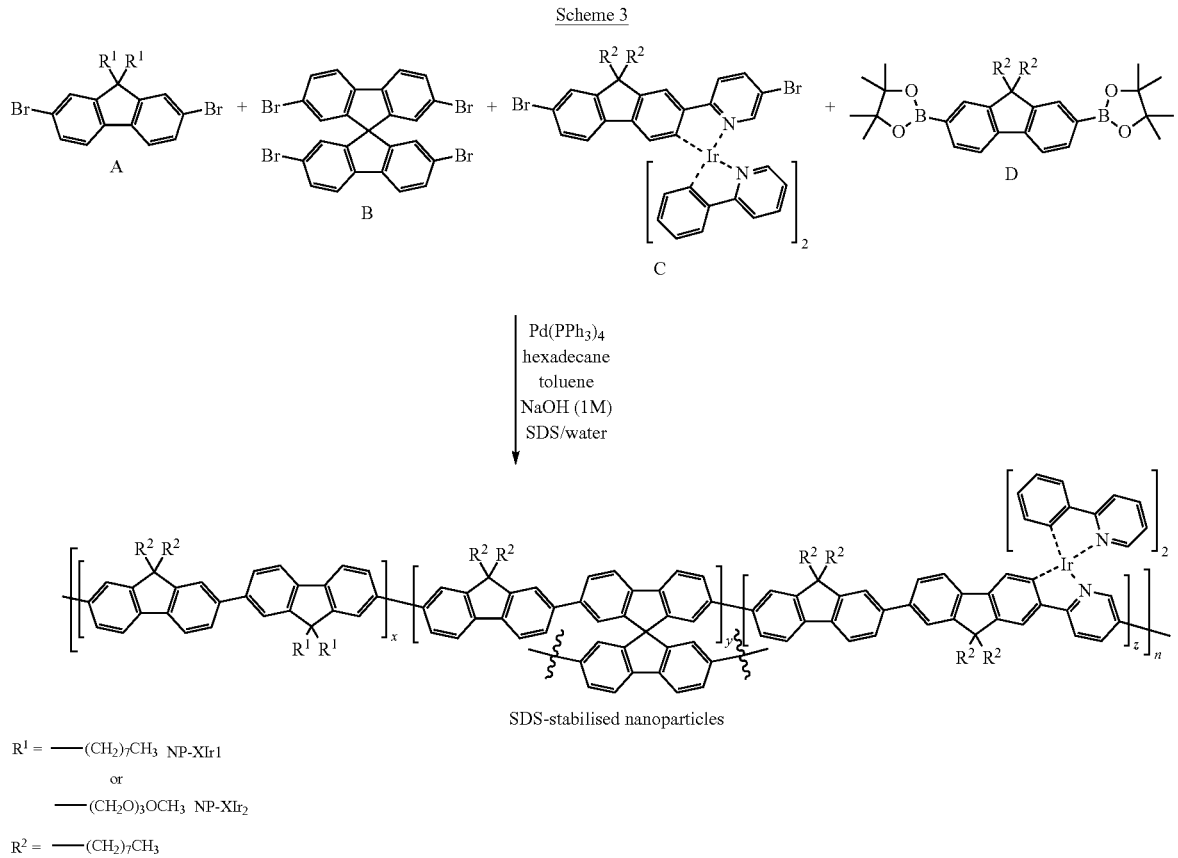

Scheme 3

$R^1 = $ ——$(CH_2)_7CH_3$  NP-XIr1
or
——$(CH_2O)_3OCH_3$  NP-XIr2

$R^2 = $ ——$(CH_2)_7CH_3$

TABLE 7

Reaction variables for synthesis of cross-linked phosphorescent nanoparticles

| Sample Name | Monomer A Side Chain ($R^1$) | Monomer A (mass, moles) |
|---|---|---|
| NP-XIr1 | Octyl | 30.0 mg |
| NP-XIr2 | MeO-PEG3 | 5.47 × 10$^{-2}$ mmol 33.7 mg 5.57 × 10$^{-2}$ mmol |

DLS Analysis (Nanoparticles in Water or THF)

Figure 6:
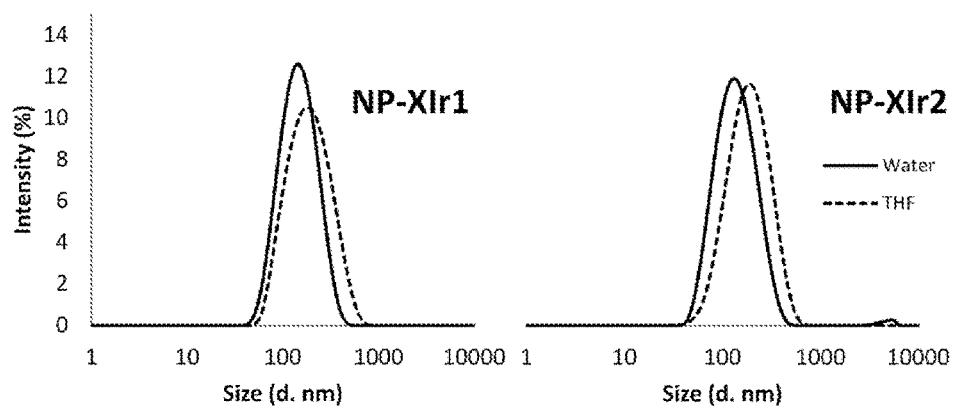
FIG. 6 shows DLS sizing histograms of cross-linked phosphorescent nanoparticles in water (solid line) or THF (broken line) of the cross-linked nanoparticles of Example 3.

Surfactant removal was carried out using the general procedure described in Example 1. Flocculation and resuspension in THF were carried out using the general procedure described in Example 1. DLS analysis was carried out as in Example 1, using either water or THF as the dispersant. The results are provided in Table 8 and FIG. 6.

TABLE 8

DLS analysis of cross-linked phosphorescent nanoparticles in water or THF

| Sample Name | Dispersant | Z-Average (d · nm) | Size by Intensity (d · nm) | St. Dev (nm) | PdI |
|---|---|---|---|---|---|
| NP-XIr1 | Water | 131 | 158 | 69 | 0.15 |
| NP-XIr1 | THF | 167 | 210 | 109 | 0.18 |
| NP-XIr2 | Water | 126 | 150 (99.3%) 4709 (0.7%)[a] | 70 (99.3%) 774 (0.7%)[a] | 0.19 |
| NP-XIr2 | THF | 165 | 205 | 98 | 0.18 |

[a]Secondary peak likely to result from a small proportion of aggregated nanoparticles UV/Vis and PL Analysis (Nanoparticles in Water or THF)

Figure 7:
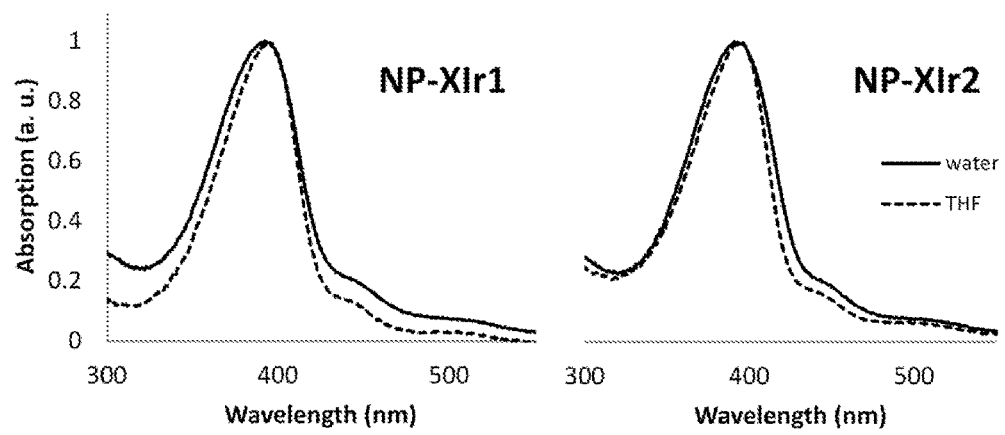
FIG. 7 shows UV/Vis spectra of the cross-linked nanoparticles of Example 3 in water (solid line) or THF (broken line).
Figure 8:
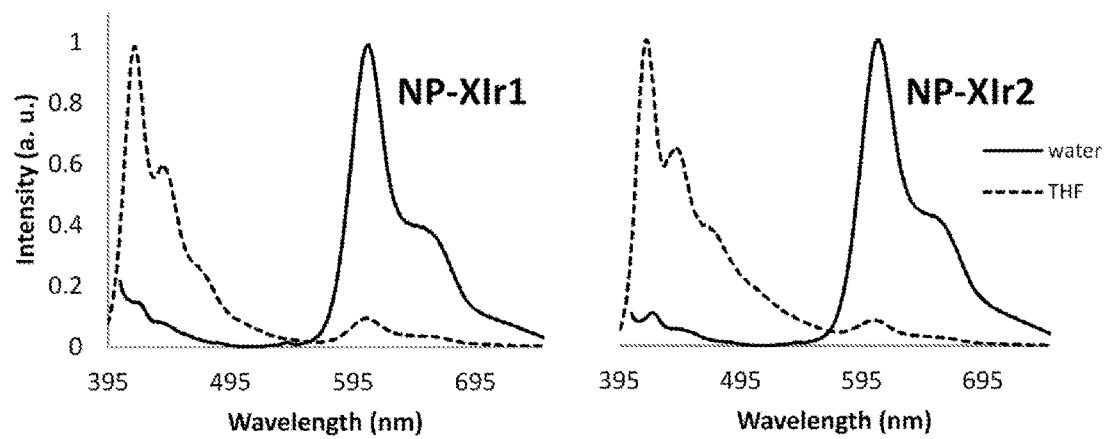
FIG. 8 shows PL spectra of the cross-linked nanoparticles of Example 3 in water (solid line) or THF (broken line).

The general UV/Vis and PL analytical procedures described in Example 1 were used to record the UV/Vis (FIG. 7) and PL (FIG. 8) spectra of the nanoparticles in dilute aqueous dispersion or THF.

PL Analysis (Nanoparticles in Water)

PL measurements were obtained using the general method described in Example 1. The results are provided in Table 9.

TABLE 9

Optical properties of cross-linked phosphorescent nanoparticles in water

| Sample Name | $\lambda_{max}$ | $\lambda_{em}$[a] |
|---|---|---|
| NP-Ir1 | 392 | 609 |
| NP-Ir2 | 392 | 609 |

[a] $\lambda_{ex}$ = 390 nm

EXAMPLE 4

PEG3 Functionalised 10% Cross-Linked PFO Nanoparticles

Synthesis

Referring to Scheme 4 shown below, tetraethylammonium hydroxide solution (40% in water) (0.1567 g, 0.4 mmol), was added to an aqueous solution (50 ml) of non-ionic surfactant, Triton x-102 (2.5 g, 5 wt % in deionised water) in a 100 ml three necked round bottom flask. Then contents were then through degassed for 30 mins by bubbling nitrogen gas through the stirred solution. Then a separate 10 ml two necked round bottom flask was used to mix together the monomers in the organic solvent prior to addition to the reaction flask. 9,9-dioctylfluorene-2,7-diboronic acid-bis(1,3-propanediol)ester (0.1151 g, 0.2 mmol), 2,7-dibromo-9,9-bis(2-(2-(2-methoxyethoxy)ethoxy)ethyl)fluorene (0.0967 g, 0.16 mmol) and 2,2',7,7'-tetrabromo-9,9'-spirobifluorene (0.0126 g, 0.02 mmol) were dissolved in xylene (2 ml). The monomer solution was degassed and then the catalyst IPr*PdTEACl$_2$ (0.0095 g, 0.008 mmol) was added, followed by further degassing of the resultant solution. A syringe was used to transfer the monomer/catalyst into the stirred surfactant/base solution in the main reaction flask now maintained at 30° C. with stirring and maintaining under nitrogen gas for 24 h.

Scheme 4

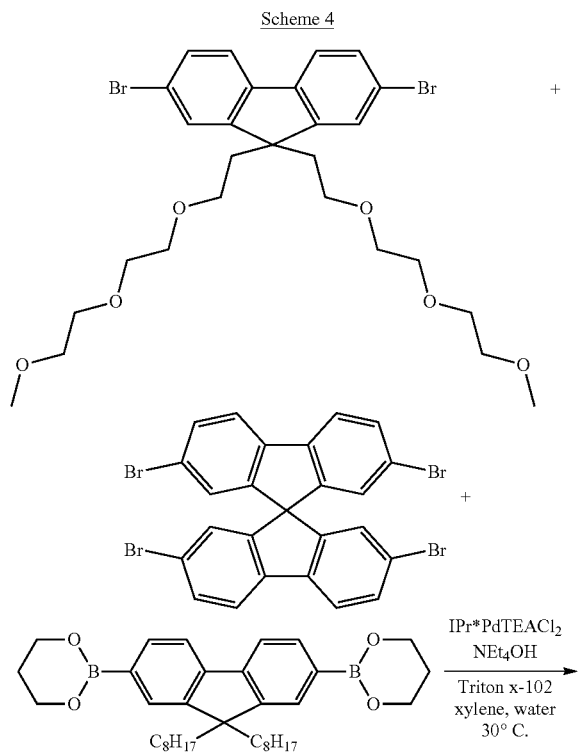

LM55

DLS Analysis (Nanoparticles in Water or THF)

Figure 9:
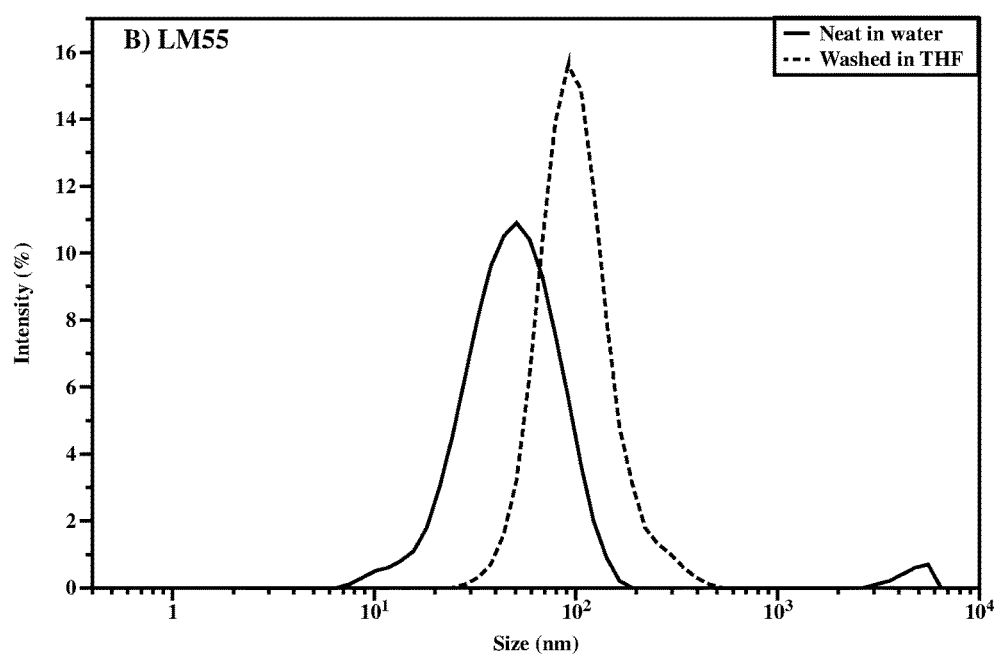
FIG. 9 shows DLS sizing histograms of the cross-linked nanoparticles of Example 4 in water (solid line) and THF (broken line).

500 µl of sample was transferred to centrifuge vial the 1.5 ml of methanol was added. The sample vial was centrifuged at 14,000 rpm for 5 min then the liquid was decanted. Crude sample was washed with methanol 3 times and re-dispersed in THF in order to measure the size of particles. Neat products without further purification were also investigated. The results are shown in FIG. 9 and Table 10. Concentrations of polymer in water was 23 µg/ml.

TABLE 10

Particle sizes of CPNs in water and THF at 25° C.

| Sample | Size (nm) | Dz (nm) | STD (nm) | PdI |
|---|---|---|---|---|
| LM55 Neat | 50 | 44 | 26.81 | 0.244 |
| LM55 in THF | 108 | 218 | 51.80 | 0.217 |

Optical Properties

Figure 12:
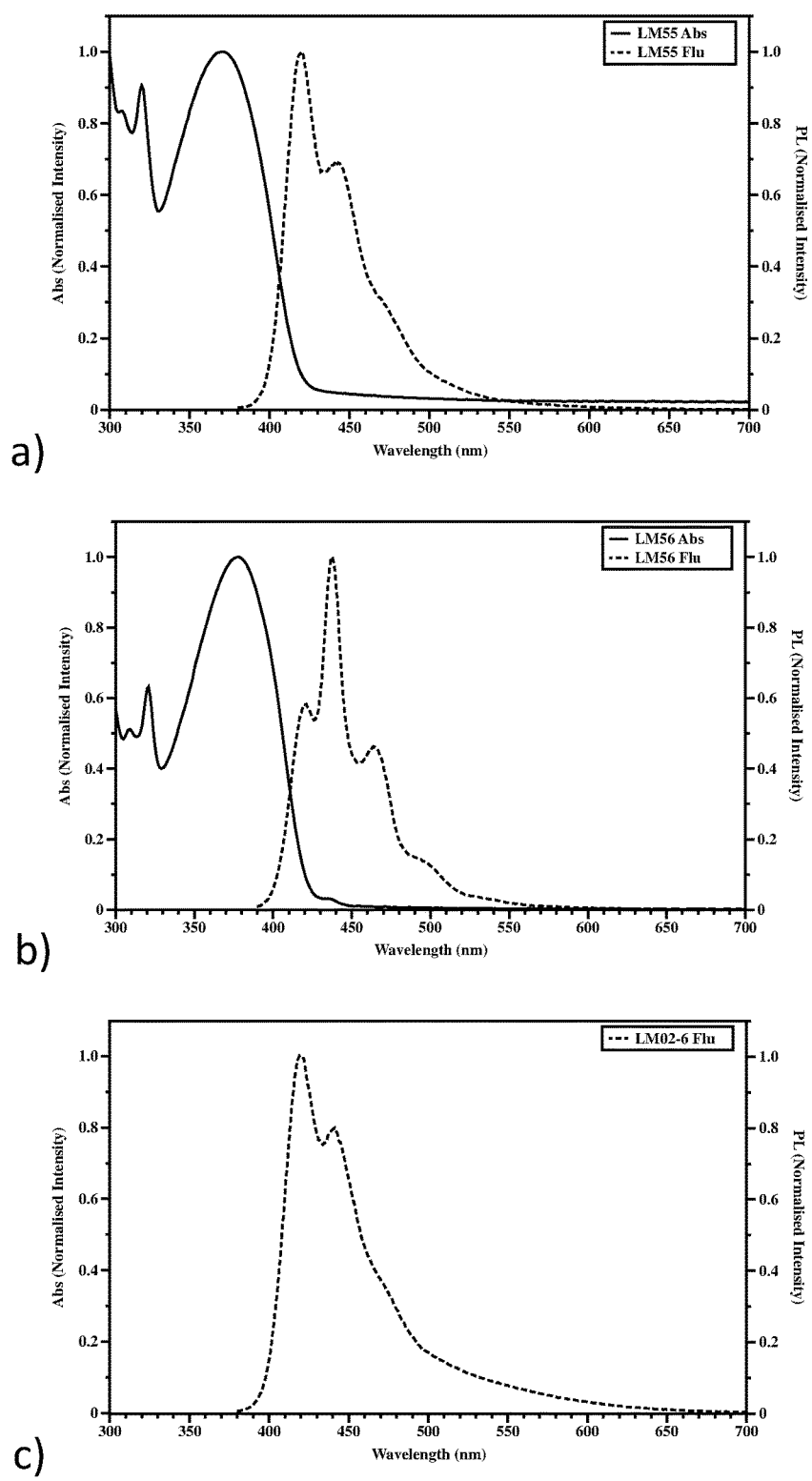
FIG. 12 shows absorption and emission spectra of the cross-linked nanoparticles of Examples 4 (FIG. 12a), 5 (FIG. 12b) and 6 (FIG. 12c).

Referring to Table 11 and FIG. 12, LM55 exhibited maxima band at 370 nm but no β-phase was observed.

TABLE 11

Summarized optical properties of cross-linked polymer in water

| Sample | Final polymer conc. (mg/ml) | Size (nm) | $\lambda_{abs}$ (nm) | $\lambda_{em}$ (nm) | $E_g$* |
|---|---|---|---|---|---|
| LM55 | 2.5 | 50 | 370 | 420, 441 | 2.91 |

EXAMPLE 5

PEG3 Functionalised 5% Cross-Linked PFO Nanoparticles

Synthesis

Referring to Scheme 5 shown below, tetraethylammonium hydroxide solution (40% in water) (0.1567 g, 0.4 mmol), was added to an aqueous solution (50 ml) of non-ionic surfactant, Triton x-102 (2.5 g, 5 wt % in deionised water) in a 100 ml three necked round bottom flask. Then contents were then through degassed for 30 mins by bubbling nitrogen gas through the stirred solution. Then a separate 10 ml two necked round bottom flask was used to mix together the monomers in the organic solvent prior to addition to the reaction flask. 9,9-dioctylfluorene-2,7-diboronic acid-bis(1,3-propanediol)ester (0.1151 g, 0.2 mmol), 2,7-dibromo-9,9-dioctylfluorene (0.0768 g, 0.14 mmol), 2,7-dibromo-9,9-bis(2-(2-(2-methoxyethoxy)ethoxy)ethyl)fluorene (0.0242 g, 0.04 mmol) and 2,2',7,7'-tetrabromo-9,9'-spirobifluorene (0.0063 g, 0.01 mmol) were dissolved in xylene (2 ml). The monomer solution was degassed and then the catalyst IPr*PdTEACl$_2$ (0.0095 g, 0.008 mmol) was added, followed by further degassing of the resultant solution. A syringe was used to transfer the monomer/catalyst into the stirred surfactant/base solution in the main reaction flask now maintained at 30° C. with stirring and maintaining under nitrogen gas for 24 h.

Scheme 5

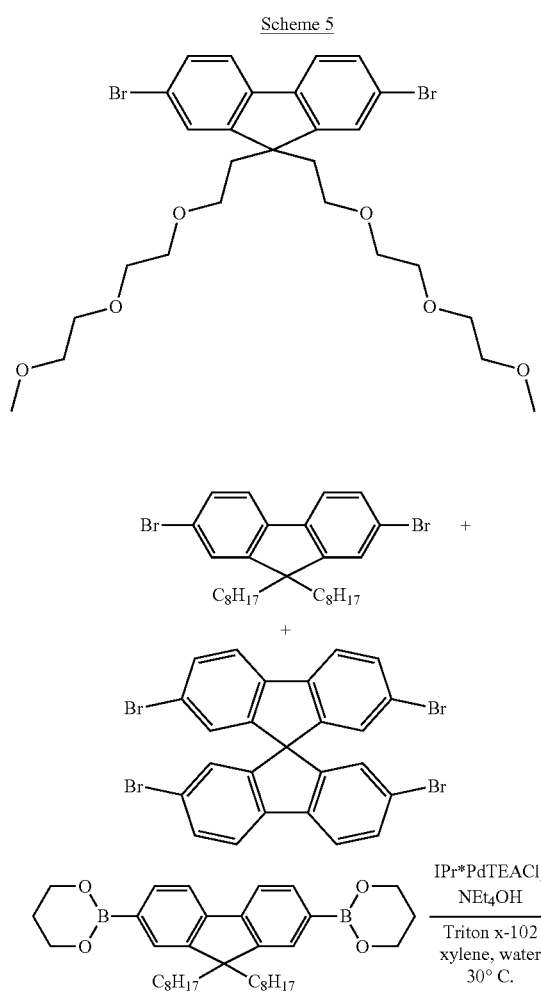

LM56

DLS Analysis (Nanoparticles in Water or THF)

Figure 10:
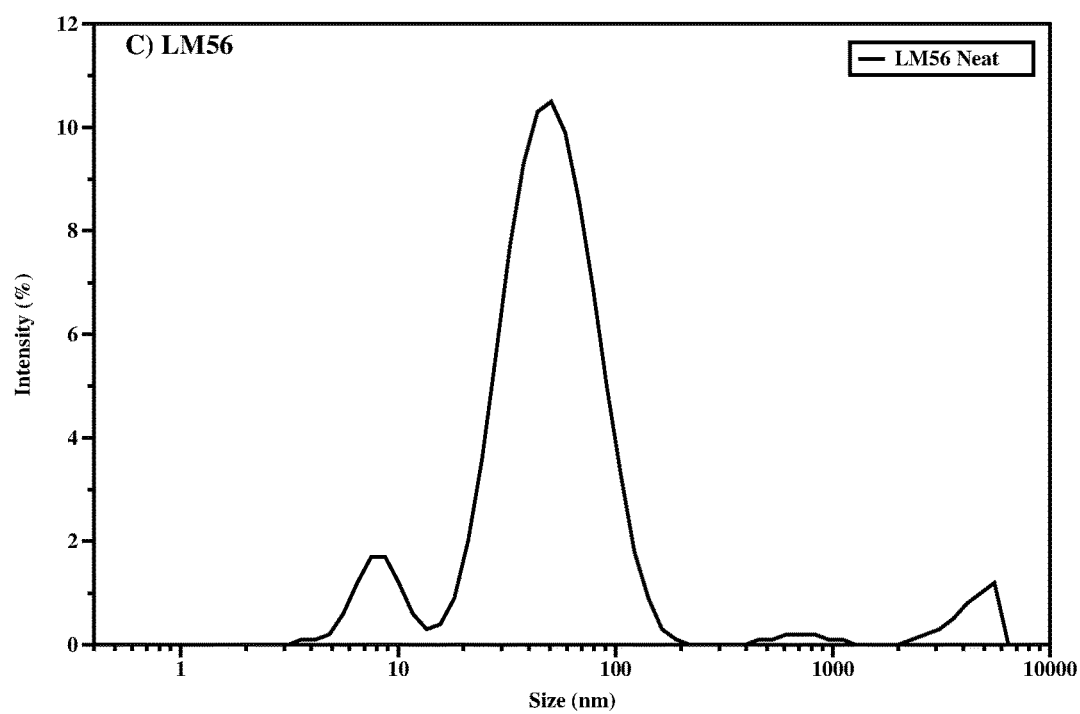
FIG. 10 shows DLS sizing histograms of the cross-linked nanoparticles of Example 5 in water.

500 µl of sample was transferred to centrifuge vial the 1.5 ml of methanol was added. The sample vial was centrifuged at 14,000 rpm for 5 min then the liquid was decanted. Crude sample was washed with methanol 3 times and re-dispersed in THF in order to measure the size of particles. Neat products without further purification were also investigated. The results are shown in FIG. 10 and Table 12. Concentrations of polymer in water was 23 µg/ml.

TABLE 12

| Particle sizes of CPNs in water at 25° C. | | | |
|---|---|---|---|
| Sample | Size (nm) | Dz (nm) | STD (nm) | PdI |
| LM56 Neat | 55 | 41 | 26.23 | 0.381 |

Optical Properties

Referring to Table 13 and FIG. 12, LM56 showed absorption peak at 378 nm.

TABLE 13

| Summarized optical properties of cross-linked polymer in water | | | | | |
|---|---|---|---|---|---|
| Sample | Final polymer conc. (mg/ml) | Size (nm) | $\lambda_{abs}$ (nm) | $\lambda_{em}$ (nm) | $E_g^*$ |
| LM56 | 2.5 | 55 | 378, 435 | 421, 436, 453 | 2.78 |

EXAMPLE 6

PEG12 Functionalised 10% Cross-Linked PFO Nanoparticles

Synthesis

Referring to Scheme 6 below, tetraethylammonium hydroxide solution (40% in water) (0.1567 g, 0.4 mmol), was added to an aqueous solution (50 ml) of non-ionic surfactant, Triton x-102 (2.5 g, 5 wt % in de-ionised water) in a 100 ml three necked round bottom flask. Then contents were then through degassed for 30 mins by bubbling nitrogen gas through the stirred solution. Then a separate 10 ml two necked round bottom flask was used to mix together the monomers in the organic solvent prior to addition to the reaction flask. 9,9-dioctylfluorene-2,7-di-boronic acid-bis(1,3-propanediol)ester (0.1151 g, 0.2 mmol), 2,7-dibromo-9,9-bis(polyethylene glycol monoether)fluorene (0.2255 g, 0.16 mmol) and 2,2',7,7'-tetrabromo-9,9'-spirobifluorene (0.0126 g, 0.02 mmol) were dissolved in xylene (2 ml). The monomer solution was degassed and then the catalyst IPr*PdTEACl$_2$ (0.0095 g, 0.008 mmol) was added, followed by further degassing of the resultant solution. A syringe was used to transfer the monomer/catalyst into the stirred surfactant/base solution in the main reaction flask now maintained at 30° C. with stirring and maintaining under nitrogen gas for 24 h.

Scheme 6

LM02-6

DLS Analysis (Nanoparticles in Water or THF)

Figure 11:
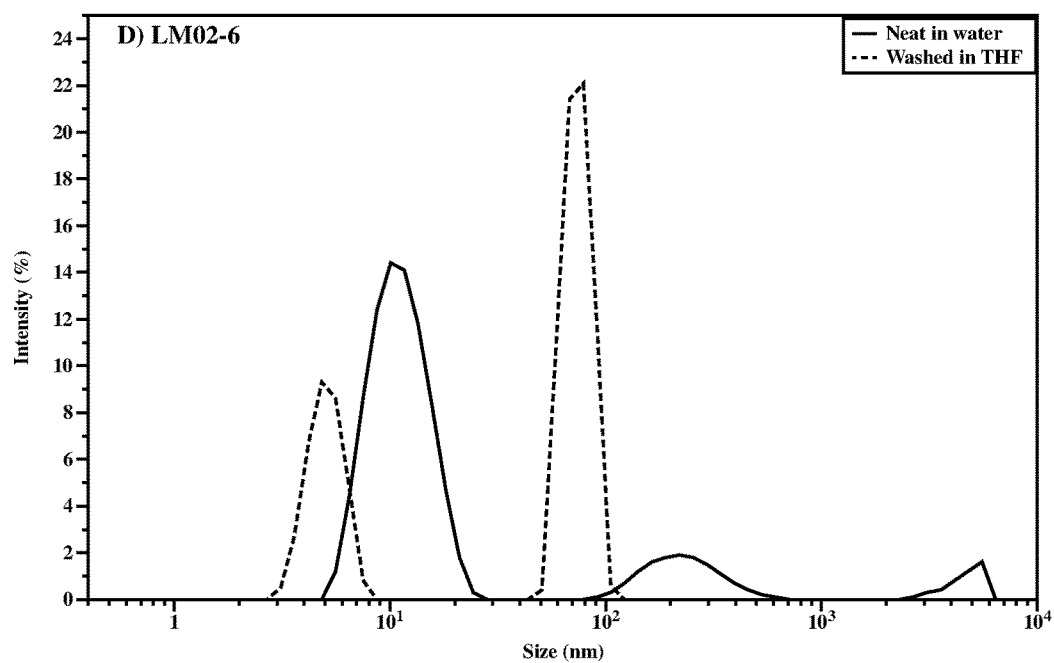
FIG. 11 shows DLS sizing histograms of the cross-linked nanoparticles of Example 6 in water (broken line) and THF (solid line).

500 µl of sample was transferred to centrifuge vial the 1.5 ml of methanol was added. The sample vial was centrifuged at 14,000 rpm for 5 min then the liquid was decanted. Crude sample was washed with methanol 3 times and re-dispersed in THF in order to measure the size of particles. Neat products without further purification were also investigated. The results are shown in FIG. 11 and Table 14. Concentrations of polymer in water was 23 μg/ml.

TABLE 14

Particle sizes of CPNs in water and THF at 25° C.

| Sample | Size (nm) | Dz (nm) | STD (nm) | PdI |
|---|---|---|---|---|
| LM02-6 Neat | 244 | 13 | 103.2 | 0.359 |
| LM02-6 in THF | 74 | 847 | 10.97 | 0.489 |

Optical Properties

Table 15 and FIG. 12 show summarized optical properties for LM02-6 in water.

TABLE 15

Summarized optical properties of cross-linked polymer in water

| Sample | Final polymer conc. (mg/ml) | Size (nm) | $\lambda_{abs}$ (nm) | $\lambda_{em}$ (nm) | $E_g^*$ |
|---|---|---|---|---|---|
| LM02-6 | 2.5 | 244 | N/A | 419, 441 | N/A |

EXAMPLE 7

5% 1,3-Diphenoxypropane Cross-Linked Polyfluorene Nanoparticles

Synthesis

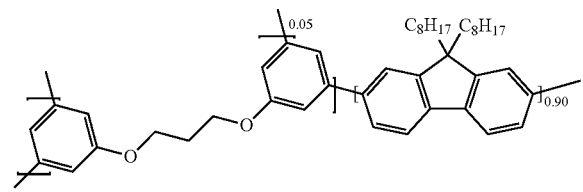

In a Schlenk tube was added water (22.0 mL), sodium dodecyl sulfate (110 mg, 382 μmol) and 1M aqueous sodium hydroxide (800 μL, 800 μmol). The solution was purged with argon for 2 hours. In a vial was weighed 9,9-dioctyl-fluorene-2,7-diboronic acid bis(1,3-propanediol) ester (111.7 mg, 200 μmol), 9,9-dioctyl-2,7-dibromofluorene (87.8 mg, 160 μmol), 1,3-bis(3,5-dibromophenoxy)propane (10.9 mg, 20 μmol), tris(dibenzylideneacetone) dipalladium (0) (4.6 mg, 5 μmol), tri(o-tolyl)phosphine (9.1 mg, 30 μmol) and hexadecane (171 μL, 585 μmol). The vial was transferred to an argon filled glovebox, sealed with a rubber septum and removed. Toluene (2.19 mL) was added to the vial and the suspension sonicated until a homogenous solution was achieved. The initial aqueous solution was cooled to 0° C. in an ice bath, the ultrasonic probe inserted and the toluene solution injected rapidly into the water. The solution was ultrasonicated for 1 minute, stirred for 30 seconds and ultrasonicated for 1 further minute The Schlenk tube was sealed, placed in a preheated oil bath at 50° C. and stirred for 16 hours. The Schlenk was opened and a stream of nitrogen gas passed over the emulsion at 50° C., with stirring. The emulsion was cooled to room temperature, the volume increased to 23.0 mL using deionised water and filtered through a glass wool plug. The emulsion was obtained as a milky light green solution. DLS (water): Z-average=110 nm, PdI=0.156, $D_n$=69 nm and SD=21.0 nm. UV-Vis Abs. (water): $\lambda_{max}$=379 nm, $\lambda_{sec.}$=432 nm, $\lambda_{onset}$=455 nm. UV-Vis PL (water): $\lambda_{max}$=439 nm, $\lambda_{sec.}$=467 nm, $\lambda_{sec.}$=499 nm, $\lambda_{sec.}$=534 nm.

EXAMPLE 8

5% 1,1'-Biphenyl Cross-Linked Polyfluorene Nanoparticles

Synthesis

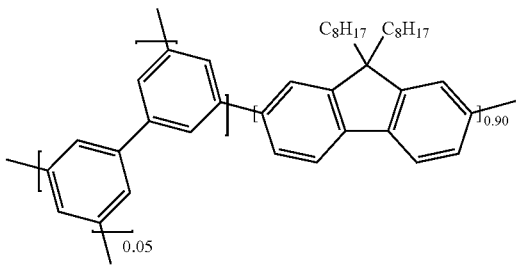

In a Schlenk tube was added water (22.0 mL), sodium dodecyl sulfate (110 mg, 382 μmol) and 1M aqueous sodium hydroxide (800 μL, 800 μmol). The solution was purged with argon for 2 hours. In a vial was weighed 9,9-dioctyl-fluorene-2,7-diboronic acid bis(1,3-propanediol) ester (111.7 mg, 200 μmol), 9,9-dioctyl-2,7-dibromofluorene (87.8 mg, 160 μmol), 3,3',5,5'-tetrabromo-1,1'-biphenyl (9.4 mg, 20 μmol), tris(dibenzylideneacetone)dipalladium(0) (4.6 mg, 5 μmol), tri(o-tolyl)phosphine (9.1 mg, 30 μmol) and hexadecane (171 μL, 585 μmol). The vial was transferred to an argon filled glovebox, sealed with a rubber septum and removed. Toluene (2.19 mL) was added to the vial and the suspension sonicated until a homogenous solution was achieved. The initial aqueous solution was cooled to 0° C. in an ice bath, the ultrasonic probe inserted and the toluene solution injected rapidly into the water. The solution was ultrasonicated for 1 minute, stirred for 30 seconds and ultrasonicated for 1 further minute. The Schlenk tube was sealed, placed in a preheated oil bath at 50° C. and stirred for 16 hours. The Schlenk was opened and a stream of nitrogen gas passed over the emulsion at 50° C., with stirring. The emulsion was cooled to room temperature, the volume increased to 23.0 mL using deionised water and filtered through a glass wool plug. The emulsion was obtained as a milky light green solution. DLS (water): Z-average=110 nm, PdI=0.134, $D_n$=61 nm and SD=21.7 nm. UV-Vis Abs. (water): $\lambda_{max}$=378 nm, $\lambda_{sec.}$=432 nm, $\lambda_{onset}$=451 nm. UV-Vis PL (water): $\lambda_{max}$=438 nm, $\lambda_{sec.}$=466 nm, $\lambda_{sec.}$=497 nm, $\lambda_{sec.}$=534 nm.

EXAMPLE 9

5% 9,9'-(1,3-Propanediyl)bis[9-octyl-9H-fluorene] Cross-Linked Polyfluorene Nanoparticles Synthesis

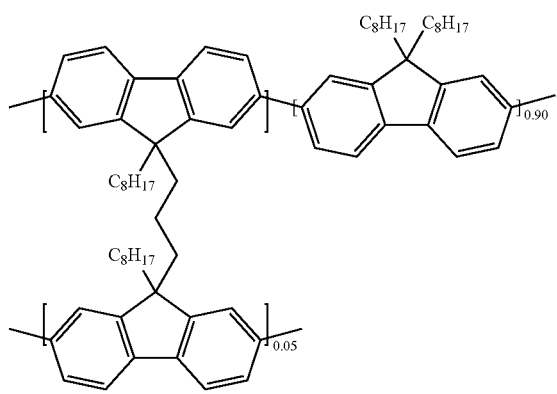

In a Schlenk tube was added water (22.0 mL), sodium dodecyl sulfate (110 mg, 382 µmol) and 1M aqueous sodium hydroxide (800 µL, 800 µmol). The solution was purged with argon for 2 hours. In a vial was weighed 9,9-dioctyl-fluorene-2,7-diboronic acid bis(1,3-propanediol) ester (111.7 mg, 200 µmol), 9,9-dioctyl-2,7-dibromofluorene (87.8 mg, 160 µmol), 9,9'-(1,3-propyldiyl)bis[2,7-dibromo-9H-Fluorene-9-octyl] (18.3 mg, 20 µmol), tris(dibenzylideneacetone)dipalladium(0) (4.6 mg, 5 µmol), tri(o-tolyl)phosphine (9.1 mg, 30 µmol) and hexadecane (171 µL, 585 µmol). The vial was transferred to an argon filled glovebox, sealed with a rubber septum and removed. Toluene (2.19 mL) was added to the vial and the suspension sonicated until a homogenous solution was achieved. The initial aqueous solution was cooled to 0° C. in an ice bath, the ultrasonic probe inserted and the toluene solution injected rapidly into the water. The solution was ultrasonicated for 1 minute, stirred for 30 seconds and ultrasonicated for 1 further minute. The Schlenk tube was sealed, placed in a preheated oil bath at 50° C. and stirred for 16 hours. The Schlenk was opened and a stream of nitrogen gas passed over the emulsion at 50° C., with stirring. The emulsion was cooled to room temperature, the volume increased to 23.0 mL using deionised water and filtered through a glass wool plug. The emulsion was obtained as a milky light green solution. DLS (water): Z-average=118 nm, PdI=0.133, $D_n$=71.7 nm and SD=24.6 nm. UV-Vis Abs. (water): $\lambda_{max}$=383 nm, $\lambda_{sec.}$=433 nm, $\lambda_{onset}$=451 nm. UV-Vis PL (water): $\lambda_{max}$=439 nm, $\lambda_{sec.}$=466 nm, $\lambda_{sec.}$=498 nm, $\lambda_{sec.}$=535 nm.

EXAMPLE 10

5% 5'-Phenyl-1,1':3',1''-terphenyl Cross-Linked Polyfluorene Nanoparticles

Synthesis

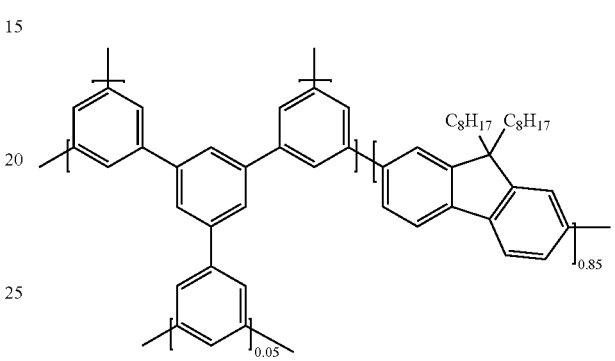

In a Schlenk tube was added water (22.0 mL), sodium dodecyl sulfate (110 mg, 382 µmol) and 1M aqueous sodium hydroxide (800 µL, 800 µmol). The solution was purged with argon for 2 hours. In a vial was weighed 9,9-dioctyl-fluorene-2,7-diboronic acid bis(1,3-propanediol) ester (111.7 mg, 200 µmol), 9,9-dioctyl-2,7-dibromofluorene (76.8 mg, 140 µmol), 3,3'',5,5''-tetrabromo-5'-(3,5-dibromophenyl)-1,1':3',1''-terphenyl (15.6 mg, 20 µmol), tris(dibenzylideneacetone)dipalladium(0) (4.6 mg, 5 µmol), tri(o-tolyl)phosphine (9.1 mg, 30 µmol) and hexadecane (171 µL, 585 µmol). The vial was transferred to an argon filled glovebox, sealed with a rubber septum and removed. Toluene (2.19 mL) was added to the vial and the suspension sonicated until a homogenous solution was achieved. The initial aqueous solution was cooled to 0° C. in an ice bath, the ultrasonic probe inserted and the toluene solution injected rapidly into the water. The solution was ultrasonicated for 1 minute, stirred for 30 seconds and ultrasonicated for 1 further minute. The Schlenk tube was sealed, placed in a preheated oil bath at 50° C. and stirred for 16 hours. The Schlenk was opened and a stream of nitrogen gas passed over the emulsion at 50° C., with stirring. The emulsion was cooled to room temperature, the volume increased to 23.0 mL using deionised water and filtered through a glass wool plug. The emulsion was obtained as a milky light green solution. DLS (water): Z-average=108 nm, PdI=0.148, $D_n$=66 nm and SD=22.5 nm. UV-Vis Abs. (water): $\lambda_{max}$=380 nm, $\lambda_{sec.}$=433 nm, $\lambda_{onset}$=452 nm. UV-Vis PL (water): $\lambda_{max}$=439 nm, $\lambda_{sec.}$=467 nm, $\lambda_{sec.}$=499 nm, $\lambda_{sec.}$=535 nm.

EXAMPLE 11

5% 2,1,3-Benzothiadiazole, 35% 9,9-Di(undecanoic acid)fluorene and 5% 9,9'-Spirobifluorene Cross-Linked Polyfluorene Nanoparticles Synthesis

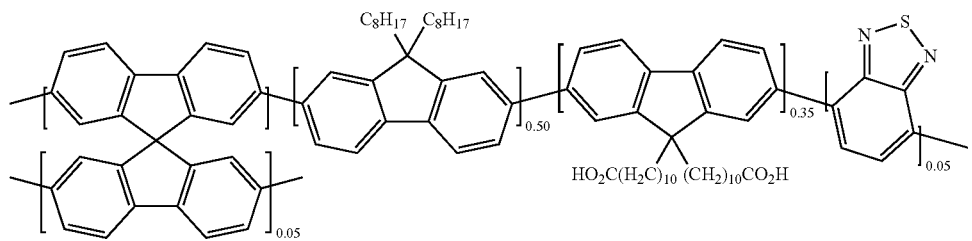

In a Schlenk tube was added water (22.0 mL), sodium dodecyl sulfate (110 mg, 382 μmol) and 1M aqueous sodium hydroxide (1080 μL, 1080 μmol). The solution was purged with argon for 2 hours. In a vial was weighed 9,9-dioctyl-fluorene-2,7-diboronic acid bis(1,3-propanediol) ester (111.7 mg, 200 μmol), 2,7-dibromo-9,9-di(undecanoic acid) fluorene (96.9 mg, 140 μmol), 2,2',7,7'-tetrabromo-9,9'-spirobifluorene (12.6 mg, 20 μmol), 4,7-dibromobenzo[c]-1,2,5-thiadiazole (5.9 mg, 20 μmol) tris(dibenzylideneacetone) dipalladium(0) (4.6 mg, 5 μmol), tri(o-tolyl)phosphine (9.1 mg, 30 μmol) and hexadecane (171 μL, 585 μmol). The vial was transferred to an argon filled glovebox, sealed with a rubber septum and removed. Toluene (2.19 mL) was added to the vial and the suspension sonicated until a homogenous solution was achieved. The initial aqueous solution was cooled to 0° C. in an ice bath, the ultrasonic probe inserted and the toluene solution injected rapidly into the water. The solution was ultrasonicated for 1 minute, stirred for 30 seconds and ultrasonicated for 1 further minute. The Schlenk tube was sealed, placed in a preheated oil bath at 50° C. and stirred for 20 hours. The Schlenk was opened and a stream of nitrogen gas passed over the emulsion at 50° C., with stirring. The emulsion was cooled to room temperature, the volume increased to 23.0 mL with deionised water and filtered through a glass wool plug. The emulsion was obtained as a milky dark green solution. DLS (water): Z-average=79.0 nm, PdI=0.117, $D_n$=52.4 nm and SD=15.3 nm. UV-Vis Abs. (water): $\lambda_{max}$=380 nm, $\lambda_{sec.}$=450 nm, $\lambda_{onset}$=520 nm. UV-Vis PL (water): $\lambda_{max}$=535 nm, $\lambda_{sec.}$=424 nm.

EXAMPLE 12

40% Di(t-Butyl Hexanoate)Fluorene and 5% 9,9'-Spirobifluorene Cross-Linked Polyfluorene Nanoparticles Synthesis

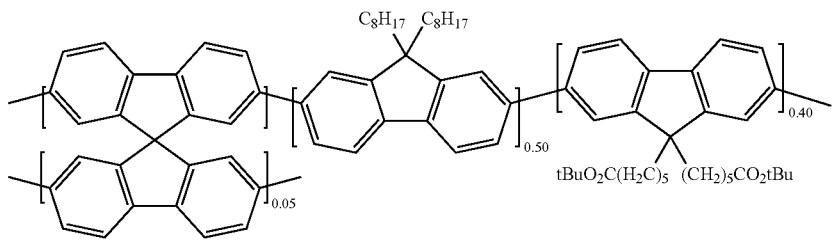

In a Schlenk tube was added water (22.0 mL), sodium dodecyl sulfate (110 mg, 382 µmol) and 1M aqueous sodium hydroxide (800 µL, 800 µmol). The solution was purged with argon for 2 hours. In a vial was weighed 9,9-dioctyl-9H-fluorene-2,7-diboronic acid bis(pinacol) ester (128.5 mg, 200 µmol), 2,7-dibromo-9,9-di(t-butyl hexanoate)fluorene (106.3 mg, 160 µmol), 2,2',7,7'-tetrabromo-9,9'-spirobifluorene (12.6 mg, 20 µmop, tetrakis (triphenylphosphine) palladium(0) (5.8 mg, 5 µmol) and hexadecane (171 µL, 585 µmol). The vial was transferred to an argon filled glovebox, sealed with a rubber septum and removed. Toluene (2.19 mL) was added to the vial and the suspension sonicated until a homogenous solution was achieved. The initial aqueous solution was cooled to 0° C. in an ice bath, the ultrasonic probe inserted and the toluene solution injected rapidly into the water. The solution was ultrasonicated for 1 minute, stirred for 30 seconds and ultrasonicated for 1 further minute. The Schlenk tube was sealed, placed in a preheated oil bath at 72° C. and stirred for 20 hours. The Schlenk was opened and a stream of nitrogen gas passed over the emulsion at 50° C., with stirring. The emulsion was cooled to room temperature, the volume increased to 23.0 mL with deionised water and filtered through a glass wool plug. The emulsion was obtained as a milky light green solution. DLS (water): Z-average=129 nm, PdI=0.226, $D_n$=64 nm and SD=23.4 nm. UV-Vis Abs. (water): $\lambda_{max}$=384 nm, $\lambda_{onset}$=441 nm. UV-Vis PL (water): $\lambda_{max}$=430 nm, $\lambda_{sec.}$=453 nm, $\lambda_{sec.}$=484 nm.

EXAMPLE 13

5% 4,7-Bis(4-hexylthiophen-2-yl)benzo[c][1,2,5]thiadiazole and 5% 9,9'-Spirobifluorene Cross-Linked Polyfluorene Nanoparticles Synthesis

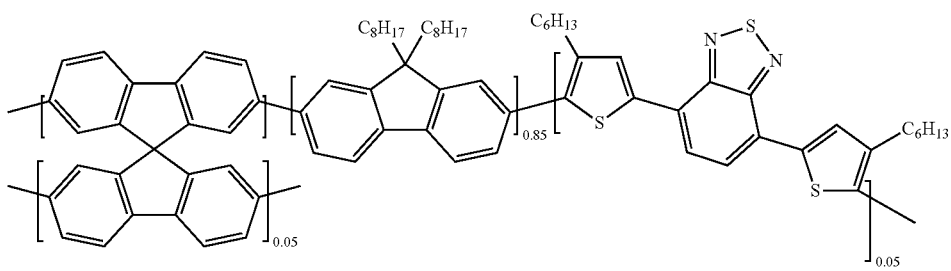

In a Schlenk tube was added water (22.0 mL), sodium dodecyl sulfate (110 mg, 382 µmol) and 1M aqueous sodium hydroxide (800 µL, 800 µmol). The solution was purged with argon for 2 hours. In a vial was weighed 9,9-dioctyl-fluorene-2,7-diboronic acid bis(1,3-propanediol) ester (111.7 mg, 200 µmol), 9,9-dioctyl-2,7-dibromofluorene (76.8 mg, 140 µmop, 2,2',7,7'-tetrabromo-9,9'-spirobifluorene (12.6 mg, 20 µmol), 4,7-bis(5-bromo-4-hexyl-2-thienyl)-2,1,3-benzothiadiazole (12.5 mg, 20 µmol), tris(dibenzylideneacetone)dipalladium(0) (4.6 mg, 5 µmol), tri(o-tolyl)phosphine (9.1 mg, 30 µmol) and hexadecane (171 µL, 585 µmol). The vial was transferred to an argon filled glovebox, sealed with a rubber septum and removed. Toluene (2.19 mL) was added to the vial and the suspension sonicated until a homogenous solution was achieved. The initial aqueous solution was cooled to 0° C. in an ice bath, the ultrasonic probe inserted and the toluene solution injected rapidly into the water. The solution was ultrasonicated for 1 minute, stirred for 30 seconds and ultrasonicated for 1 further minute. The Schlenk tube was sealed, placed in a preheated oil bath at 50° C. and stirred for 20 hours. The Schlenk was opened and a stream of nitrogen gas passed over the emulsion at 50° C., with stirring. The emulsion was cooled to room temperature, the volume increased to 23.0 mL with deionised water and filtered through a glass wool plug. The emulsion was obtained as a milky bright red solution. DLS (water): Z-average=105 nm, PdI=0.125, $D_n$=64.4 nm and SD=20.8 nm. UV-Vis Abs. (water): $\lambda_{max}$=382 nm, $\lambda_{sec}$=433 nm, $\lambda_{sec.}$=514 nm, $\lambda_{onset}$=620 nm. UV-Vis PL (water): $\lambda_{max}$=621 nm, $\lambda_{sec.}$=437 nm.

EXAMPLE 14

10% 4,7-Bis(4-hexylthiophen-2-yl)benzo[c][1,2,5]thiadiazole and 5% 9,9'-Spirobifluorene Cross-Linked Polyfluorene Nanoparticles Synthesis

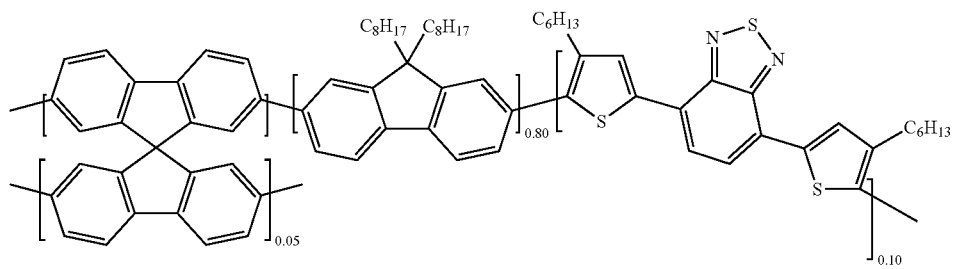

In a Schlenk tube was added water (22.0 mL), sodium dodecyl sulfate (110 mg, 382 μmol) and 1M aqueous sodium hydroxide (800 μL, 800 μmol). The solution was purged with argon for 2 hours. In a vial was weighed 9,9-dioctyl-fluorene-2,7-diboronic acid bis(1,3-propanediol) ester (111.7 mg, 200 μmol), 9,9-dioctyl-2,7-dibromofluorene (65.8 mg, 120 μmol), 2,2',7,7'-tetrabromo-9,9'-spirobifluorene (12.6 mg, 20 μmol), (25.1 mg, 40 μmol), tris(dibenzylideneacetone) dipalladium(0) (4.6 mg, 5 μmol), tri(o-tolyl)phosphine (9.1 mg, 30 μmol) and hexadecane (171 μL, 585 μmol). The vial was transferred to an argon filled glovebox, sealed with a rubber septum and removed. Toluene (2.19 mL) was added to the vial and the suspension sonicated until a homogenous solution was achieved. The initial aqueous solution was cooled to 0° C. in an ice bath, the ultrasonic probe inserted and the toluene solution injected rapidly into the water. The solution was ultrasonicated for 1 minute, stirred for 30 seconds and ultrasonicated for 1 further minute. The Schlenk tube was sealed, placed in a preheated oil bath at 50° C. and stirred for 20 hours. The Schlenk was opened and a stream of nitrogen gas passed over the emulsion at 50° C., with stirring. The emulsion was cooled to room temperature, the volume increased to 23.0 mL with deionised water and filtered through a glass wool plug. The emulsion was obtained as a milky bright red solution. DLS (water): Z-average=130 nm, PdI=0.264, $D_n$=58.4 nm and SD=20.9 nm. UV-Vis Abs. (water): $\lambda_{max}$=382 nm, $\lambda_{sec.}$=432 nm, $\lambda_{sec.}$=515 nm, $\lambda_{onset}$=623 nm. UV-Vis PL (water): $\lambda_{max}$=625 nm.

EXAMPLE 15

2% 9,9-Di(undecanoic acid)fluorene, 5% 2,1,3-Benzothiadiazole, 33% Di(hex-5-en-1-yl)fluorene and 5% 9,9'-Spirobifluorene Cross-Linked Polyfluorene Nanoparticles Synthesis

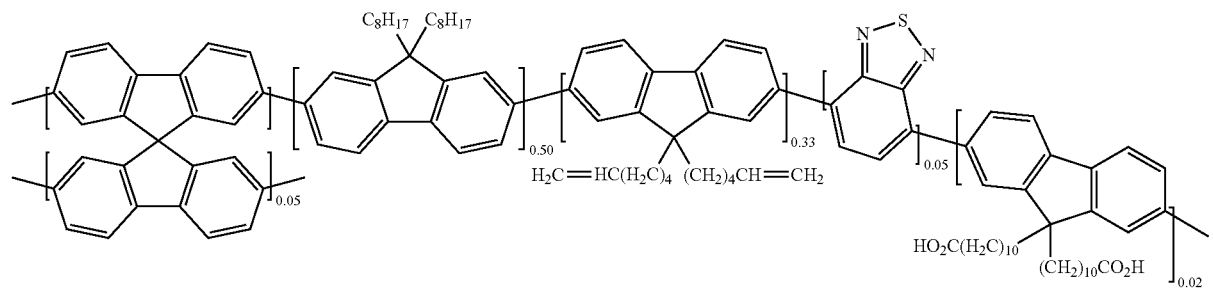

In a Schlenk tube was added water (22.0 mL), sodium dodecyl sulfate (110 mg, 382 µmol) and 1M aqueous sodium hydroxide (816 µL, 816 µmol). The solution was purged with argon for 2 hours. In a vial was weighed 9,9-dioctyl-fluorene-2,7-diboronic acid bis(1,3-propanediol) ester (111.7 mg, 200 µmol), 2,7-dibromo-9,9-di(undecanoic acid) fluorene (5.5 mg, 8 µmol), 2,2',7,7'-tetrabromo-9,9'-spirobifluorene (12.6 mg, 20 µmol), 4,7-dibromobenzo[c]-1,2,5-thiadiazole (5.9 mg, 20 µmol), 2,7-dibromo-9,9-di(hex-5-en-1-yl)fluorene (64.5 mg, 132 µmol), tris(dibenzylideneacetone)dipalladium(0) (4.6 mg, 5 µmol), tri(o-tolyl)phosphine (9.1 mg, 30 µmol) and hexadecane (171 µL, 585 µmol). The vial was transferred to an argon filled glovebox, sealed with a rubber septum and removed. Toluene (2.19 mL) was added to the vial and the suspension sonicated until a homogenous solution was achieved. The initial aqueous solution was cooled to 0° C. in an ice bath, the ultrasonic probe inserted and the toluene solution injected rapidly into the water. The solution was ultrasonicated for 1 minute, stirred for 30 seconds and ultrasonicated for 1 further minute. The Schlenk tube was sealed, placed in a preheated oil bath at 50° C. and stirred for 20 hours. The Schlenk was opened and a stream of nitrogen gas passed over the emulsion at 50° C., with stirring. The emulsion was cooled to room temperature, the volume increased to 23.0 mL with deionised water and filtered through a glass wool plug. The emulsion was obtained as a milky dark green solution. DLS (water): Z-average=101 nm, PdI=0.166, $D_n$=55.1 nm and SD=18.1 nm. UV-Vis Abs. (water): $\lambda_{max}$=381 nm, $\lambda_{sec.}$=453 nm, $\lambda_{onset}$=522 nm. UV-Vis PL (water): $\lambda_{max}$=530 nm.

EXAMPLE 16

CL-F8T2 CPNs

Synthesis

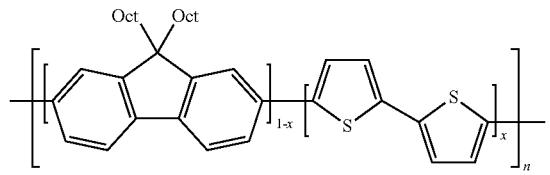

In a Schlenk tube, sodium dodecyl sulfate (50 mg) was dissolved in deionised water (10 mL) under argon. The solution was degassed by bubbling with argon for 30 minutes. In a separate vial, monomer A (58.6 mg, 9.12×10$^{-2}$ mmol), monomer B, monomer C (see amounts in Table 1), monomer D (5.8 mg, 9.12×10$^{-3}$ mmol), tris(dibenzylideneacetone)dipalladium(0) (0.9 mg, 0.98×10$^{-3}$ mmol) and tri(o-tolyl)phosphine (1.2 mg, 3.9×10$^{-3}$ mmol) were dissolved in toluene (1 mL). Hexadecane was added (78 µL) and the mixture was degassed by bubbling with argon for 5 min. After this time, the monomer mixture was then injected to the SDS solution. To promote the miniemulsion, the Schlenk tube was taken to an ice bath and the mixture was sonicated using an ultrasonicator fitted with microtip (Cole Parmer 750 W ultrasonicator, 22% amplitude) for 2 minutes. The tube was resealed and then heated up to 72° C. Once reached this temperature, an aqueous solution of sodium hydroxide 1M (365 µL) was added and the reaction mixture was stirred for 16 h. After cooling down to room temperature, the Schlenk tube was opened and the mixture was stirred for 5 h to remove the residual toluene. To remove SDS, 400 µL of the resulting miniemulsion was diluted with 1.6 mL of deionised water and Amberlite XAD-2 (20 mg) previously washed with water (2×2 mL) was added. The mixture was stirred for 2 hours at room temperature and the Amberlite XAD-2 was removed. Treatment with Amberlite XAD-2 was repeated until the mixture was shaken and no foam formation was longer observed.

Table 15 below shows the amount of monomers B and C used. Table 16 below shows the particle size of the CL-F8T2 CPNs. Table 17 shows the optical properties of CL-F8T2 CPNs in water & THF.

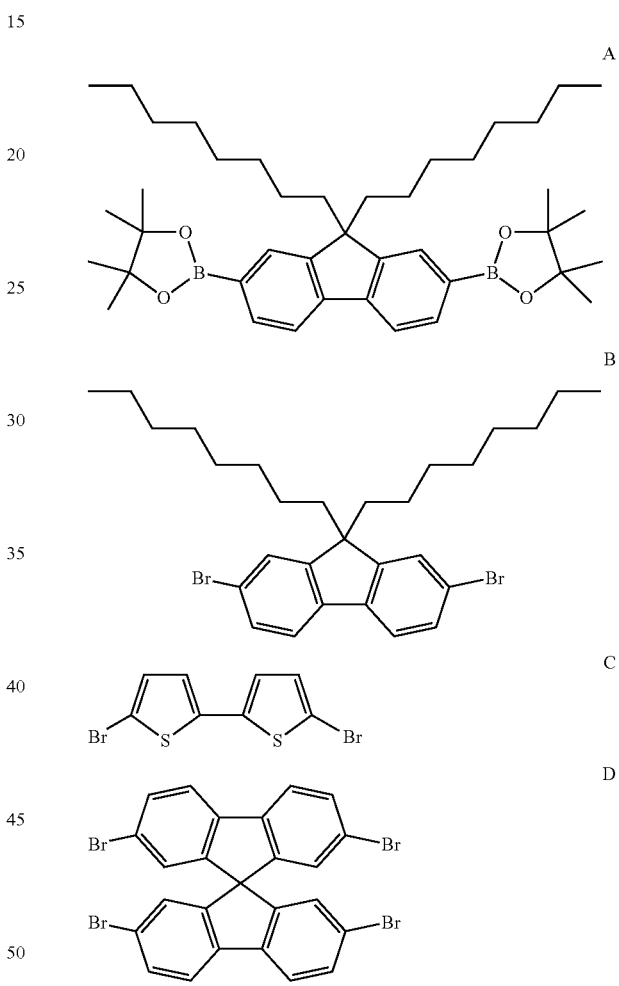

TABLE 15

| Initial loading of monomers B and C in CL-F8T2 CPNs | | | |
|---|---|---|---|
| Polymer | Monomer C (% mol) | Monomer B (mass, moles) | Monomer C (mass, moles) |
| CL-F8T2/20 | 20 | 20 mg (3.65 × 10$^{-2}$ mmol) | 11.8 mg (3.65 × 10$^{-3}$ mmol) |
| CL-F8T2/30 | 30 | 10 mg (1.82 × 10$^{-2}$ mmol) | 17.8 mg (5.48 × 10$^{-2}$ mmol) |

TABLE 16

Particle size of CL-F812 CPNs in water & THF

| | Water | | | THF | | |
|---|---|---|---|---|---|---|
| Polymer | $d_z$ (nm) | PdI | $D_{Num}$ (nm) | $d_z$ (nm) | PdI | $D_{Num}$ (nm) |
| CL-F8T2/20 | 105 | 0.158 | 64 | 124 | 0.212 | 62 |
| CL-F8T2/30 | 103 | 0.178 | 53 | 120 | 0.223 | 63 |

TABLE 17 optical properties of CL-F8T2 CPNs in water & THF

| | Water | | THF | |
|---|---|---|---|---|
| Polymer | Absorption $\lambda_{max}$ (nm) | Fluorescence $\lambda_{max}$ (nm) | Absorption $\lambda_{max}$ (nm) | Fluorescence $\lambda_{max}$ (nm) |
| CL-F8T2/20 | 386 | 554 | 394 | 525 |
| CL-F8T2/30 | 431 | 541 | 438 | 498 |

EXAMPLE 17

5% N,N,N',N-Tetraphenylbenzidine Cross-Linked Polyfluorene Nanoparticles

Synthesis

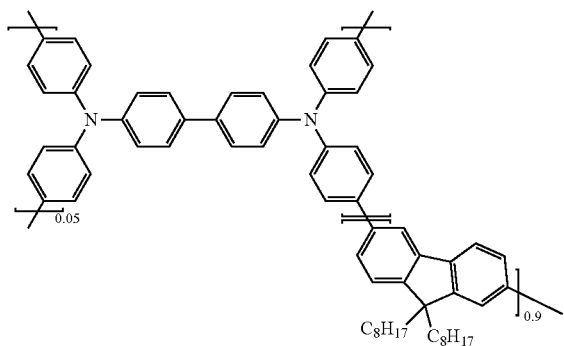

In a Schlenk tube was added water (22.0 mL), sodium dodecyl sulfate (110 mg, 382 μmol) and 1M aqueous sodium hydroxide (800 μL, 800 μmol). The solution was purged with argon for 2 hours. In a vial was weighed 9,9-dioctyl-fluorene-2,7-diboronic acid bis(1,3-propanediol) ester (111.7 mg, 200 μmol), 9,9-dioctyl-2,7-dibromofluorene (87.8 mg, 160 μmol), $N^4,N^4,N^{4'},N^{4'}$-tetrakis(4-bromophenyl)-[1,1'-biphenyl]-4,4'-diamine (16.1 mg, 20 μmol), tris(dibenzylideneacetone)dipalladium(0) (4.6 mg, 5 μmol), tri(o-tolyl)phosphine (9.1 mg, 30 μmol) and hexadecane (171 μL, 585 μmol). The vial was transferred to an argon filled glovebox, sealed with a rubber septum and removed. Toluene (2.19 mL) was added to the vial and the suspension sonicated until a homogenous solution was achieved. The initial aqueous solution was cooled to 0° C. in an ice bath, the ultrasonic probe inserted and the toluene solution injected rapidly into the water. The solution was ultrasonicated for 1 minute, stirred for 30 seconds and ultrasonicated for 1 further minute. The Schlenk tube was sealed, placed in a preheated oil bath at 50° C. and stirred for 16 hours. The Schlenk was opened and a stream of nitrogen gas passed over the emulsion at 50° C., with stirring. The emulsion was cooled to room temperature, the volume increased to 23.0 mL using deionised water and filtered through a glass wool plug. The emulsion was obtained as a milky light green solution. DLS (water): Z-average=112 nm, PdI=0.150, $D_n$=72.5 nm and SD=22.3 nm. UV-Vis Abs. (water): $\lambda_{max}$=384 nm, $\lambda_{sec.}$=433 nm, $\lambda_{onset}$=452 nm. UV-Vis PL (water): $\lambda_{max}$=438 nm, $\lambda_{sec.}$=467 nm, $\lambda_{sec.}$=496 nm, $\lambda_{sec.}$=535 nm.

EXAMPLE 18

5% Pyrene Cross-Linked Polyfluorene Nanoparticles

Synthesis

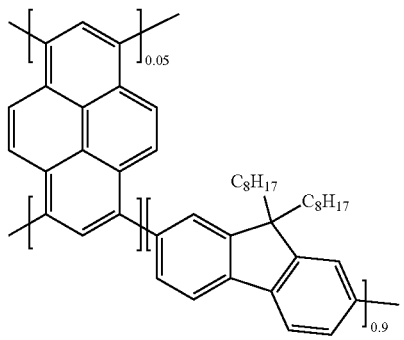

In a Schlenk tube was added water (22.0 mL), sodium dodecyl sulfate (110 mg, 382 μmol) and 1M aqueous sodium hydroxide (800 μL, 800 μmol). The solution was purged with argon for 2 hours. In a vial was weighed 9,9-dioctyl-9H-fluorene-2,7-diboronic acid bis(pinacol) ester (128.5 mg, 200 μmol), 9,9-dioctyl-2,7-dibromofluorene (87.8 mg, 160 μmol), 1,3,6,8-tetrabromopyrene (10.4 mg, 20 μmol), tris(dibenzylideneacetone)dipalladium(0) (4.6 mg, 5 μmol), tri(o-tolyl)phosphine (9.1 mg, 30 μmol) and hexadecane (171 μL, 585 μmol). The vial was transferred to an argon filled glovebox, sealed with a rubber septum and removed. Toluene (2.19 mL) was added to the vial and the suspension sonicated until a homogenous solution was achieved. The initial aqueous solution was cooled to 0° C. in an ice bath, the ultrasonic probe inserted and the toluene solution injected rapidly into the water. The solution was ultrasonicated for 1 minute, stirred for 30 seconds and ultrasonicated for 1 further minute. The Schlenk tube was sealed, placed in a preheated oil bath at 72° C. and stirred for 20 hours. The Schlenk was opened and a stream of nitrogen gas passed over the emulsion at 50° C., with stirring. The emulsion was cooled to room temperature, the volume increased to 23.0 mL with deionised water and filtered through a glass wool plug. The emulsion was obtained as a milky light green solution. DLS (water): Z-average=103 nm, PdI=0.141, $D_n$=71.5 nm and SD=21.8 nm. UV-Vis Abs. (water): $\lambda_{max}$=376 nm, $\lambda_{sec.}$=432 nm, $\lambda_{onset}$=452 nm. UV-Vis PL (water): $\lambda_{max}$=439 nm, $\lambda_{sec.}$=466 nm, $\lambda_{sec.}$=498 nm, $\lambda_{sec.}$=532 nm.

EXAMPLE 19

5% 5,10,15,20-tetrakis(4-bromophenyl)-21H,23H-porphine (Zinc) Cross-Linked Polyfluorene Nanoparticles Synthesis

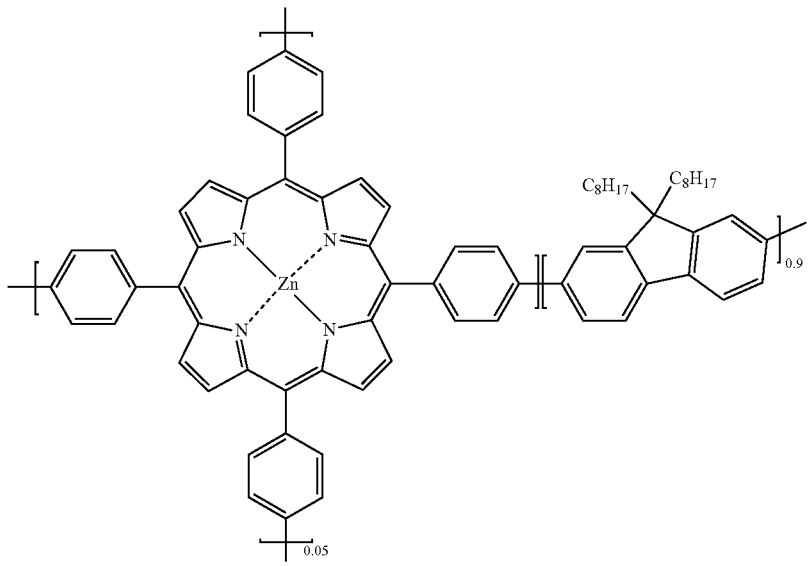

In a Schlenk tube was added water (22.0 mL), sodium dodecyl sulfate (110 mg, 382 µmol) and 1M aqueous sodium hydroxide (800 µL, 800 µmol). The solution was purged with argon for 2 hours. In a vial was weighed 9,9-dioctyl-fluorene-2,7-diboronic acid bis(1,3-propanediol) ester (111.7 mg, 200 µmol), 9,9-dioctyl-2,7-dibromofluorene (87.8 mg, 160 µmol), 5,10,15,20-tetrakis(4-bromophenyl)-21H,23H-porphine (zinc) (19.9 mg, 20 µmol), tris(dibenzylideneacetone)dipalladium(0) (4.6 mg, 5 µmol), tri(o-tolyl)phosphine (9.1 mg, 30 µmol) and hexadecane (171 µL, 585 µmol). The vial was transferred to an argon filled glovebox, sealed with a rubber septum and removed. Toluene (2.19 mL) was added to the vial and the suspension sonicated until a homogenous solution was achieved. The initial aqueous solution was cooled to 0° C. in an ice bath, the ultrasonic probe inserted and the toluene solution injected rapidly into the water. The solution was ultrasonicated for 1 minute, stirred for 30 seconds and ultrasonicated for 1 further minute. The Schlenk tube was sealed, placed in a preheated oil bath at 50° C. and stirred for 16 hours. The Schlenk was opened and a stream of nitrogen gas passed over the emulsion at 50° C., with stirring. The emulsion was cooled to room temperature, the volume increased to 23.0 mL using deionised water and filtered through a glass wool plug. The emulsion was obtained as a dark green solution. DLS (water): Z-average=95.0 nm, PdI=0.135, $D_n$=64.1 nm and SD=19.7 nm. UV-Vis Abs. (water): $\lambda_{max}$=380 nm, $\lambda_{sec.}$=396 nm, $\lambda_{sec.}$=433 nm, $\lambda_{sec.}$=550 nm, $\lambda_{sec.}$=596 nm, $\lambda_{onset}$=625 nm. UV-Vis PL (water): $\lambda_{max}$=440 nm, $\lambda_{sec.}$=466 nm, $\lambda_{sec.}$=498 nm.

EXAMPLE 20

5% 5,10,15,20-Tetraphenyl-21H,23H-porphine (Zinc) Cross-Linked Polyfluorene Nanoparticles Synthesis

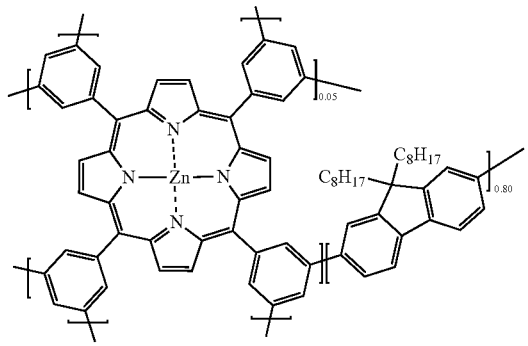

In a Schlenk tube was added water (22.0 mL), sodium dodecyl sulfate (110 mg, 382 µmol) and 1M aqueous sodium hydroxide (800 µL, 800 µmol). The solution was purged with argon for 2 hours. In a vial was weighed 9,9-dioctyl-fluorene-2,7-diboronic acid bis(1,3-propanediol) ester (111.7 mg, 200 µmol), 9,9-dioctyl-2,7-dibromofluorene (65.8 mg, 120 µmol), 5,10,15,20-tetrakis(3,5-dibromophenyl)-21H,23H-porphine (zinc) (26.2 mg, 20 µmol), tris(dibenzylideneacetone)dipalladium(0) (4.6 mg, 5 µmol), tri(o-tolyl)phosphine (9.1 mg, 30 µmol) and hexadecane (171 µL, 585 µmol). The vial was transferred to an argon filled glovebox, sealed with a rubber septum and removed. Toluene (2.19 mL) was added to the vial and the suspension sonicated until a homogenous solution was achieved. The initial aqueous solution was cooled to 0° C. in an ice bath, the ultrasonic probe inserted and the toluene solution injected rapidly into the water. The solution was ultrasonicated for 1 minute, stirred for 30 seconds and ultrasonicated for 1 further minute. The Schlenk tube was sealed, placed in a preheated oil bath at 50° C. and stirred for 16 hours. The Schlenk was opened and a stream of nitrogen gas passed over the emulsion at 50° C., with stirring. The emulsion was cooled to room temperature, the volume increased to 23.0 mL using deionised water and filtered through a glass wool plug. The emulsion was obtained as a milky dark green solution. DLS (water): Z-average=98.4 nm, PdI=0.151, $D_n$=59.9 nm and SD=19.4 nm. UV-Vis Abs. (water): $\lambda_{max}$=377 nm, $\lambda_{sec.}$=432 nm, $\lambda_{onset}$=451 nm. UV-Vis PL (water): $\lambda_{max}$=439 nm, $\lambda_{sec.}$=466 nm, $\lambda_{sec.}$=499 nm, $\lambda_{sec.}$=534 nm, $\lambda_{sec.}$=596 nm, $\lambda_{sec.}$=644 nm.

While specific embodiments of the invention have been described herein for the purpose of reference and illustration, various modifications will be apparent to a person skilled in the art without departing from the scope of the invention as defined by the appended claims.

The invention claimed is:

1. A nanoparticle composition comprising a plurality of nanoparticles formed from a π-conjugated cross-linked polymer, the π-conjugated cross-linked polymer comprising
 a) 80-99.9 mol. % of π-conjugated monomers, and
 b) 3-10 mol. % of a cross-linker having the formula I shown below:

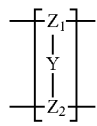

wherein
$Z_1$ and $Z_2$ are monomeric moieties, and
Y is absent, a bond, or a linking group.

2. The nanoparticles composition of claim 1, wherein the cross-linker has the formula II shown below:

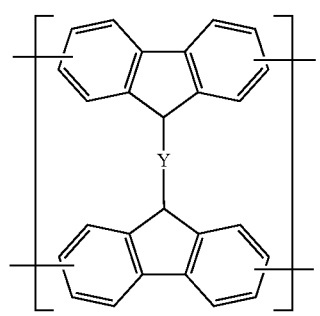

wherein
Y is absent, a bond, or a linking group.

3. The nanoparticle composition of claim 1, wherein Y is absent.

4. The nanoparticle composition of claim 1, wherein the cross linker has the formula III shown below:

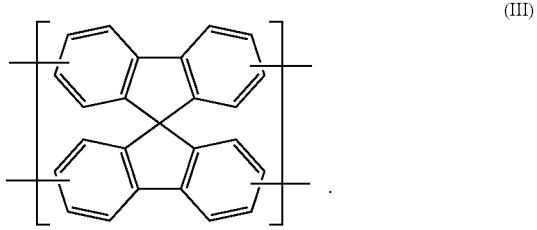

5. The nanoparticle composition of claim 1, wherein the π-conjugated monomers each independently comprise a moiety having the formula IV shown below:

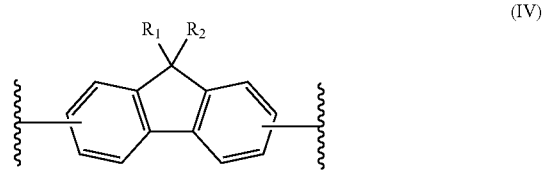

wherein
$R_1$ and $R_2$ are each independently a group:

—X-Q wherein
 X is selected from the group consisting of (1-30C)alkylene, (2-30C)alkenylene, (2-30C)alkynylene, —[(CH$_2$)$_2$—O]$_n$—, [O—(CH$_2$)$_2$]$_n$—, —(CH$_2$)$_m$(CF$_2$)$_n$—, and —[O—Si(R$_z$)$_2$]$_n$— (wherein R$_z$ is (1-4C)alkyl, n is 1 to 30, and m is 0 to 30), and
 Q is a terminal group selected from hydrogen, methyl, hydroxyl, carboxy, (1-4C)alkoxycarbonyl, amino, —C═CH$_2$, —C≡CH, —SH, -biotin, -streptavidin, —CF$_3$ and a polymerisable group selected from acrylates, epoxy and styrene;

or $R_1$ and $R_2$ are linked so that, together with the carbon atom to which they are attached, they form a ring.

6. The nanoparticle composition of claim 1, wherein the π-conjugated monomers each independently have a structure according to formula V shown below:

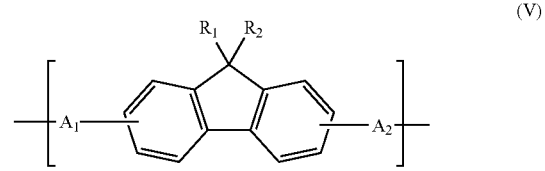

wherein
$R_1$ and $R_2$ are as defined in claim 5; and
$A_1$ and $A_2$ are independently absent or selected from any one of the following moieties:

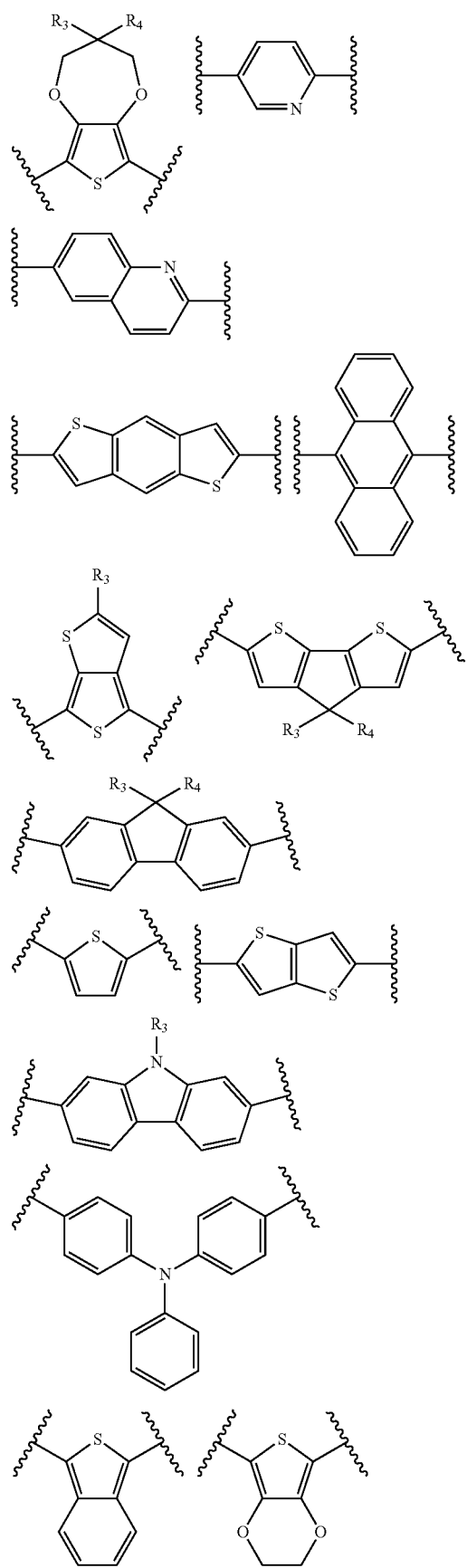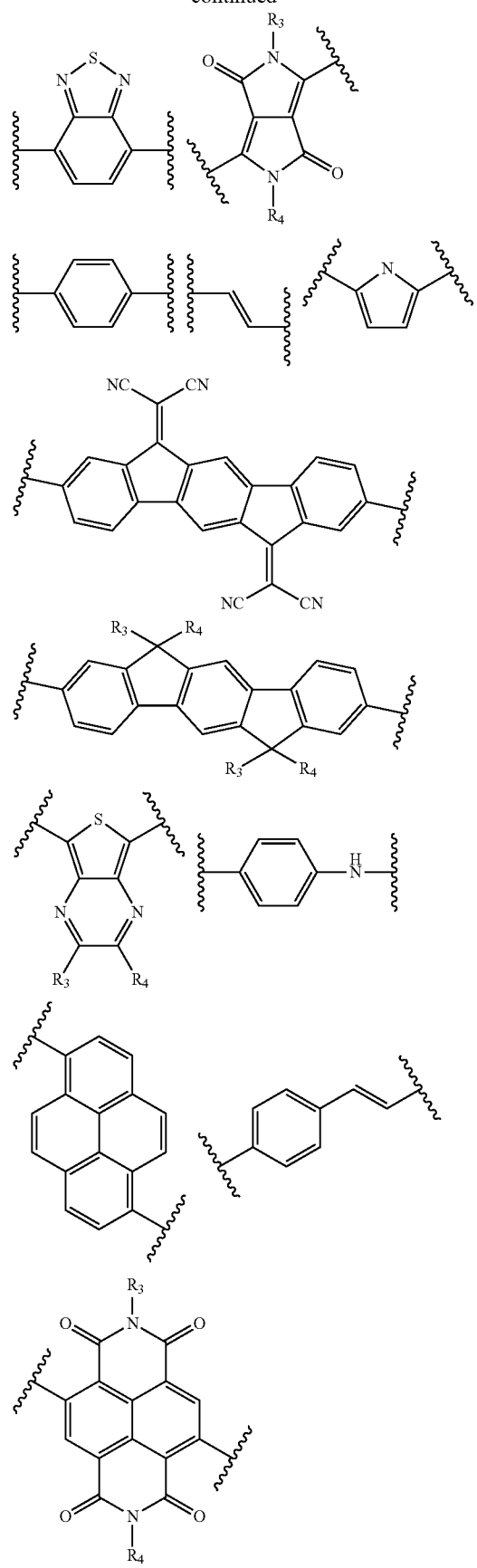

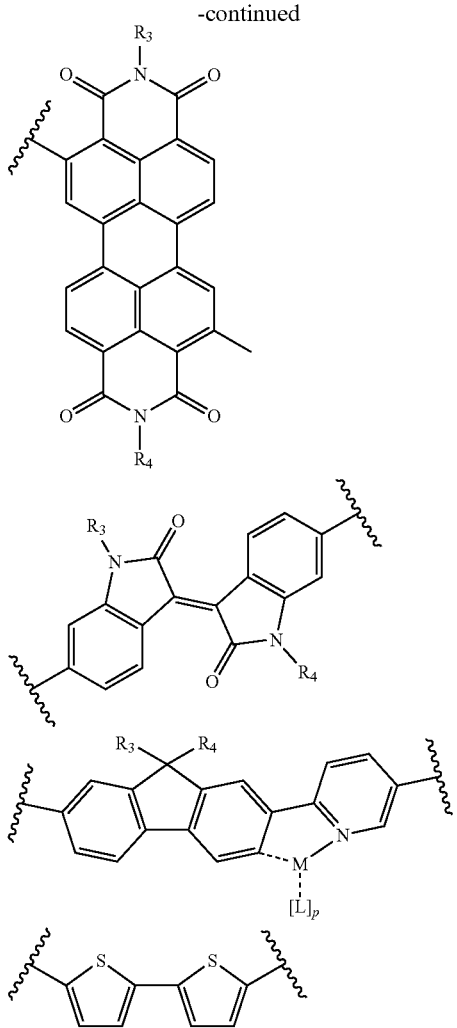

wherein
R₃ and R₄ are each independently a group:

—X¹-Q¹ wherein
X¹ is selected from the group consisting of (1-30C) alkylene, (2-30C)alkenylene, (2-30C)alkynylene, —[(CH₂)₂—O]$_n$—, [O—(CH₂)₂]$_n$—, —(CH₂)$_m$(CF₂)$_n$—, and —[O—Si(R$_z$)₂]$_n$— (wherein R$_z$ is (1-4C)alkyl, n is 1 to 30, and m is 0 to 30), and
Q¹ is a terminal group selected from hydrogen, methyl, hydroxyl, carboxy, (1-4C)alkoxycarbonyl, amino, —C═CH₂, —C≡CH, —SH, -biotin, -streptavidin, —CF₃, and a polymerisable group selected from acrylates, epoxy and styrene;
M is a metal selected from Ir, Pt, Rh, Re, Ru, Os, Cr, Cu, Pd and Au;
L is a ligand independently selected from the group consisting of halo, (1-30C)hydrocarbyl optionally comprising one or more heteroatoms selected from N, O, S, Si or P, or an aryl or heteroaryl group optionally substituted with one or more substituents selected from (1-4C)alkyl, halo, aryl or heteroaryl; and
p is 1 to 4.

7. The nanoparticle composition of claim 1, wherein the π-conjugated monomers each independently have a structure defined by formula VI below:

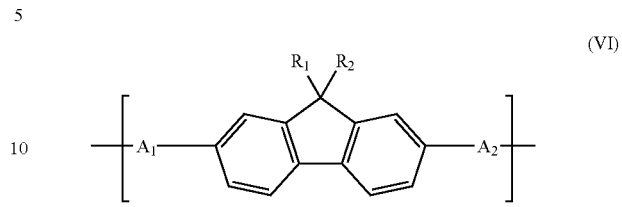

wherein
R₁ and R₂ are as defined in claim 5; and
A₁ and A₂ are as defined in claim 6.

8. The nanoparticle composition of claim 7, wherein A₁ and A₂ are independently absent or selected from any one of the following moieties:

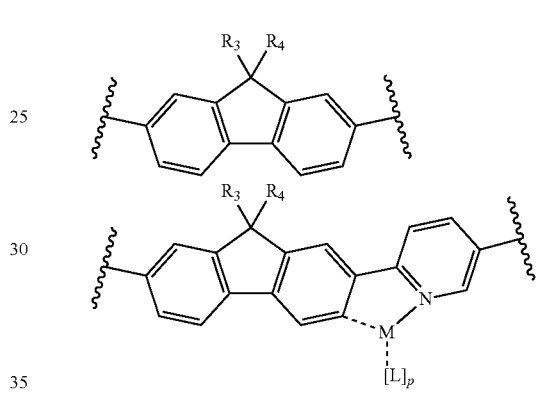

wherein R₃, R₄, M, L and p are as defined in claim 6.

9. The nanoparticle composition of claim 6, wherein one or both of A₁ and A₂ is absent.

10. The nanoparticle composition of claim 5, wherein R₁ and R₂ are each independently a group:

—X-Q wherein
X and Q are as defined in claim 5.

11. The nanoparticle composition of claim 6, wherein when present X¹ is independently selected from the group consisting of (1-30C)alkylene, (2-30C)alkenylene, (2-30C) alkynylene, —[(CH₂)₂—O]$_n$— or —[O—(CH₂)₂]$_n$— (wherein n is 1 to 30);
Q¹ is independently a terminal group selected from hydrogen, methyl, hydroxyl, carboxy, (1-4C)alkoxycarbonyl, amino, —C═CH₂ or —C≡CH;
M is a metal selected from Ir, Pt, Rh, Re, Ru, Os, Cr, Cu, Pd and Au;
L is a ligand independently selected from the group consisting of halo, (1-30C)hydrocarbyl optionally comprising one or more heteroatoms selected from N, O, S, Si or P, or an aryl or heteroaryl group optionally substituted with one or more substituents selected from (1-4C)alkyl, halo, aryl or heteroaryl; and
p is 1 to 4.

12. The nanoparticle composition of claim 6, wherein when present X¹ is independently selected from the group consisting of (4-12C)alkylene or —[(CH₂)₂—O]$_n$— (wherein n is 1 to 15);

Q¹ is independently a terminal group selected from hydrogen, (1-2C)alkoxycarbonyl and methyl;
M is Ir;
L is a ligand independently selected from the group consisting of phenyl or 6-membered heteroaryl, optionally substituted with one or more substituents selected from phenyl or 6-membered heteroaryl; and
p is 1 to 2.

13. The nanoparticle composition of claim 1 wherein the π-conjugated cross-linked polymer comprises 80-99.9 mol. % of π-conjugated monomers selected from at least one of the following structures:

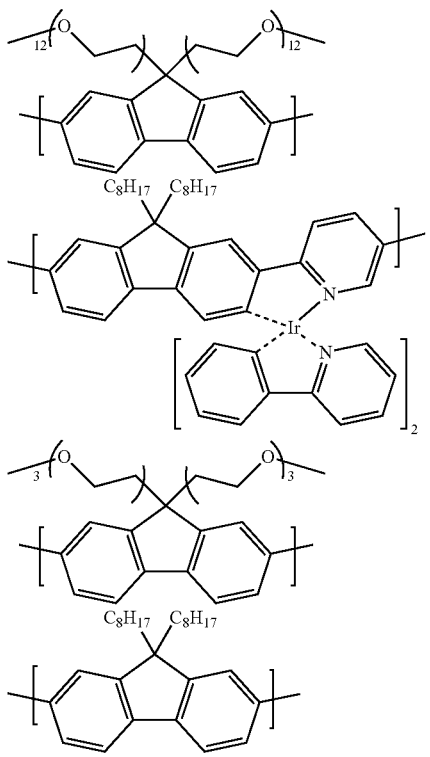

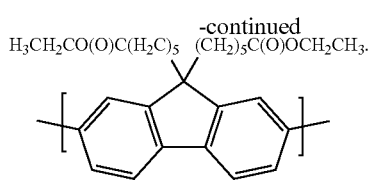

14. The nanoparticle composition of claim 1, wherein the cross-linker has the following structure:

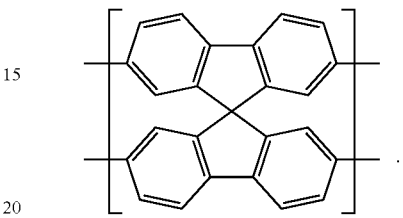

15. A method of forming a nanoparticle composition as claimed in claim 1, the method comprising the step of forming the nanoparticles by emulsion polymerisation, miniemulsion polymerisation or dispersion polymerisation techniques to provide an aqueous suspension of nanoparticles.

16. The method of claim 15, wherein the nanoparticles are formed by a cross-coupling polymerisation reaction (e.g. a Suzuki and/or Stille reaction).

17. The method of claim 15, further comprising the step of purifying the aqueous suspension of nanoparticles by contacting the aqueous suspension of nanoparticles with at least one organic solvent.

18. The method of claim 17, wherein the at least one organic solvent is selected from the group consisting of polar and non-polar solvents.

19. The method of claim 17, wherein the at least one organic solvent is methanol.

20. A nanoparticle dispersion comprising a nanoparticle composition as claimed in claim 1 dispersed throughout a dispersing medium.

* * * * *